(12) United States Patent
Bette et al.

(10) Patent No.: US 12,515,036 B2
(45) Date of Patent: Jan. 6, 2026

(54) CARDIOVASCULAR SUPPORT PUMP HAVING AN IMPELLER WITH A VARIABLE FLOW AREA

(71) Applicant: Kardion GmbH, Stuttgart (DE)

(72) Inventors: Johannes Bette, Balingen (DE); Vladimir Popov, Stuttgart (DE); Marvin Mitze, Stuttgart (DE)

(73) Assignee: Kardion GmbH, Stuttgart (DE)

( * ) Notice: Subject to any disclaimer, the term of this patent is extended or adjusted under 35 U.S.C. 154(b) by 370 days.

(21) Appl. No.: 18/026,082

(22) PCT Filed: Sep. 10, 2021

(86) PCT No.: PCT/US2021/071419
§ 371 (c)(1),
(2) Date: Mar. 13, 2023

(87) PCT Pub. No.: WO2022/056542
PCT Pub. Date: Mar. 17, 2022

(65) Prior Publication Data
US 2023/0364411 A1 Nov. 16, 2023

Related U.S. Application Data

(60) Provisional application No. 63/078,207, filed on Sep. 14, 2020.

(51) Int. Cl.
*A61M 60/221* (2021.01)
*A61M 60/13* (2021.01)
(Continued)

(52) U.S. Cl.
CPC .......... *A61M 60/221* (2021.01); *A61M 60/13* (2021.01); *A61M 60/416* (2021.01);
(Continued)

(58) Field of Classification Search
None
See application file for complete search history.

(56) References Cited

U.S. PATENT DOCUMENTS 2,254,698 A 9/1941 Hansen, Jr.
2,310,923 A 2/1943 Bean
(Continued)

FOREIGN PATENT DOCUMENTS

AU 7993698 2/1999
AU 2002308409 12/2005
(Continued)

OTHER PUBLICATIONS

"ABMD—Taking a Closer Look at Impella ECP as the Pivotal Trial Gets Underway", Guggenheim, Press Release, Mar. 29, 2022, pp. 4.
(Continued)

*Primary Examiner* — Mallika D Fairchild
(74) *Attorney, Agent, or Firm* — Knobbe, Martens, Olson & Bear, LLP

(57) ABSTRACT

The present disclosure is directed generally to mechanical cardiovascular support systems used in the medical field to assist the movement of blood. In particular the present disclosure is directed to an impeller having features that allow improved performance. An annular flow area around a rotating impeller may be variable along the axial length of the impeller. A first radial gap, between a distal region of the impeller and a surrounding tubular housing, may be greater or smaller than a second radial gap, between a proximal region of the impeller and the surrounding tubular housing.

19 Claims, 10 Drawing Sheets

(51) Int. Cl.
*A61M 60/416* (2021.01)
*A61M 60/422* (2021.01)
*A61M 60/806* (2021.01)
*A61M 60/857* (2021.01)

(52) U.S. Cl.
CPC ........ *A61M 60/422* (2021.01); *A61M 60/806* (2021.01); *A61M 60/857* (2021.01)

(56) References Cited

U.S. PATENT DOCUMENTS

| | | |
|---|---|---|
| 3,085,407 A | 4/1963 | Tomlinson |
| 3,505,987 A | 4/1970 | Heilman |
| 3,568,659 A | 3/1971 | Karnegis |
| 3,614,181 A | 10/1971 | Meeks |
| 3,747,998 A | 7/1973 | Klein et al. |
| 3,807,813 A | 4/1974 | Milligan |
| 3,995,617 A | 12/1976 | Watkins et al. |
| 4,115,040 A | 9/1978 | Knorr |
| 4,245,622 A | 1/1981 | Hutchins, IV |
| 4,471,252 A | 9/1984 | West |
| 4,522,194 A | 6/1985 | Normann |
| 4,625,712 A | 12/1986 | Wampler |
| 4,643,641 A | 2/1987 | Clausen et al. |
| 4,753,221 A | 6/1988 | Kensey et al. |
| 4,779,614 A | 10/1988 | Moise |
| 4,785,795 A | 11/1988 | Singh et al. |
| 4,817,586 A | 4/1989 | Wampler |
| 4,846,152 A | 7/1989 | Wampler et al. |
| 4,888,011 A | 12/1989 | Kung et al. |
| 4,889,131 A | 12/1989 | Salem et al. |
| 4,895,557 A | 1/1990 | Moise et al. |
| 4,896,754 A | 1/1990 | Carlson et al. |
| 4,902,272 A | 2/1990 | Milder et al. |
| 4,908,012 A | 3/1990 | Moise et al. |
| 4,927,407 A | 5/1990 | Dorman |
| 4,943,275 A | 7/1990 | Stricker |
| 4,944,722 A | 7/1990 | Carriker et al. |
| 4,968,300 A | 11/1990 | Moutafis et al. |
| 4,971,768 A | 11/1990 | Ealba |
| 4,985,014 A | 1/1991 | Orejola |
| 5,044,897 A | 9/1991 | Dorman |
| 5,061,256 A | 10/1991 | Wampler |
| 5,089,016 A | 2/1992 | Millner et al. |
| 5,090,957 A | 2/1992 | Moutafis et al. |
| 5,112,292 A | 5/1992 | Hwang et al. |
| 5,112,349 A | 5/1992 | Summers et al. |
| 5,116,305 A | 5/1992 | Milder et al. |
| 5,195,877 A | 3/1993 | Kletschka |
| 5,290,227 A | 3/1994 | Pasque |
| 5,297,940 A | 3/1994 | Buse |
| 5,313,765 A | 5/1994 | Martin |
| 5,344,443 A | 9/1994 | Palma et al. |
| 5,354,271 A | 10/1994 | Voda |
| 5,376,114 A | 12/1994 | Jarvik |
| 5,399,145 A | 3/1995 | Ito et al. |
| 5,405,383 A | 4/1995 | Barr |
| 5,443,503 A | 8/1995 | Yamane |
| 5,456,715 A | 10/1995 | Liotta |
| 5,527,159 A | 6/1996 | Bozeman, Jr. et al. |
| 5,599,173 A | 2/1997 | Chen et al. |
| 5,613,935 A | 3/1997 | Jarvik |
| 5,695,471 A | 12/1997 | Wampler |
| 5,702,430 A | 12/1997 | Larson, Jr. et al. |
| 5,720,771 A | 2/1998 | Snell |
| 5,746,709 A | 5/1998 | Rom et al. |
| 5,749,855 A | 5/1998 | Reitan |
| 5,752,976 A | 5/1998 | Duffin et al. |
| 5,766,207 A | 6/1998 | Potter et al. |
| 5,831,365 A | 11/1998 | Keim et al. |
| 5,888,241 A | 3/1999 | Jarvik |
| 5,888,242 A | 3/1999 | Antaki et al. |
| 5,904,646 A | 5/1999 | Jarvik |
| 5,911,685 A | 6/1999 | Siess et al. |
| 5,921,913 A | 7/1999 | Siess |
| 5,964,694 A | 10/1999 | Siess et al. |
| 6,001,056 A | 12/1999 | Jassawalla et al. |
| 6,007,478 A | 12/1999 | Siess et al. |
| 6,018,208 A | 1/2000 | Maher et al. |
| 6,050,975 A | 4/2000 | Poirier |
| 6,071,093 A | 6/2000 | Hart |
| 6,116,862 A | 9/2000 | Rau et al. |
| 6,123,659 A | 9/2000 | le Blanc et al. |
| 6,135,710 A | 10/2000 | Araki et al. |
| 6,149,405 A | 11/2000 | Abe et al. |
| 6,155,969 A | 12/2000 | Schima et al. |
| 6,158,984 A | 12/2000 | Cao et al. |
| 6,161,838 A | 12/2000 | Balsells |
| 6,176,848 B1 | 1/2001 | Rau et al. |
| 6,186,665 B1 | 2/2001 | Maher et al. |
| 6,210,318 B1 | 4/2001 | Lederman |
| 6,217,541 B1 | 4/2001 | Yu |
| 6,220,832 B1 | 4/2001 | Schob |
| 6,227,820 B1 | 5/2001 | Jarvik |
| 6,245,007 B1 | 6/2001 | Bedingham et al. |
| 6,254,359 B1 | 7/2001 | Aber |
| 6,264,205 B1 | 7/2001 | Balsells |
| 6,264,601 B1 | 7/2001 | Jassawalla et al. |
| 6,264,645 B1 | 7/2001 | Jonkman |
| 6,293,752 B1 | 9/2001 | Clague et al. |
| 6,351,048 B1 | 2/2002 | Schob et al. |
| 6,361,292 B1 | 3/2002 | Chang et al. |
| 6,432,136 B1 | 8/2002 | Weiss et al. |
| 6,445,956 B1 | 9/2002 | Laird et al. |
| 6,447,266 B2 | 9/2002 | Antaki et al. |
| 6,527,698 B1 | 3/2003 | Kung et al. |
| 6,530,876 B1 | 3/2003 | Spence |
| 6,533,716 B1 | 3/2003 | Schmitz-Rode et al. |
| 6,540,658 B1 | 4/2003 | Fasciano et al. |
| 6,544,216 B1 | 4/2003 | Sammler et al. |
| 6,579,257 B1 | 6/2003 | Elgas et al. |
| 6,592,620 B1 | 7/2003 | Lancisi et al. |
| 6,595,743 B1 | 7/2003 | Kazatchkov et al. |
| 6,607,368 B1 | 8/2003 | Ross et al. |
| 6,623,475 B1 | 9/2003 | Siess |
| 6,719,791 B1 | 4/2004 | Nüsser et al. |
| 6,794,789 B2 | 9/2004 | Siess et al. |
| 6,841,910 B2 | 1/2005 | Gery |
| 6,879,126 B2 | 4/2005 | Paden et al. |
| 6,912,423 B2 | 6/2005 | Ley et al. |
| 6,942,611 B2 | 9/2005 | Siess |
| 6,949,066 B2 | 9/2005 | Bearnson et al. |
| 6,969,345 B2 | 11/2005 | Jassawalla et al. |
| 7,011,620 B1 | 3/2006 | Siess |
| 7,014,620 B2 | 3/2006 | Kim |
| 7,022,100 B1 | 4/2006 | Aboul-Hosn et al. |
| 7,027,875 B2 | 4/2006 | Siess et al. |
| 7,070,398 B2 | 7/2006 | Olsen et al. |
| 7,070,555 B2 | 7/2006 | Siess |
| 7,083,588 B1 | 8/2006 | Shmulewitz et al. |
| 7,144,364 B2 | 12/2006 | Barbut et al. |
| 7,160,243 B2 | 1/2007 | Medvedev |
| 7,238,151 B2 | 7/2007 | Frazier |
| 7,241,257 B1 | 7/2007 | Ainsworth et al. |
| 7,264,606 B2 | 9/2007 | Jarvik et al. |
| 7,393,181 B2 | 7/2008 | McBride et al. |
| 7,462,019 B1 | 12/2008 | Allarie et al. |
| 7,479,102 B2 | 1/2009 | Jarvik |
| 7,502,648 B2 | 3/2009 | Okubo et al. |
| 7,736,296 B2 | 6/2010 | Siess et al. |
| 7,762,941 B2 | 7/2010 | Jarvik |
| 7,798,952 B2 | 9/2010 | Tansley et al. |
| 7,841,976 B2 | 11/2010 | McBride et al. |
| 7,850,593 B2 | 12/2010 | Vincent et al. |
| 7,878,967 B1 | 2/2011 | Khanal |
| 7,914,436 B1 | 3/2011 | Kung |
| 7,934,909 B2 | 5/2011 | Nuesser |
| 7,959,551 B2 | 6/2011 | Jarvik |
| 7,963,905 B2 | 6/2011 | Salmonsen et al. |
| 7,998,190 B2 | 8/2011 | Gharib et al. |
| 8,012,079 B2 | 9/2011 | Delgado, III |
| 8,075,472 B2 | 12/2011 | Zilbershlag et al. |
| 8,088,059 B2 | 1/2012 | Jarvik |
| 8,114,008 B2 | 2/2012 | Hidaka et al. |

(56) References Cited

U.S. PATENT DOCUMENTS

| | | |
|---|---|---|
| 8,123,669 B2 | 2/2012 | Siess et al. |
| RE43,299 E | 4/2012 | Siess |
| 8,152,845 B2 | 4/2012 | Bourque |
| 8,177,703 B2 | 5/2012 | Smith et al. |
| 8,216,122 B2 | 7/2012 | Kung |
| 8,371,997 B2 | 2/2013 | Shifflette |
| 8,376,926 B2 | 2/2013 | Benkowsi et al. |
| 8,382,695 B1 | 2/2013 | Patel |
| 8,388,565 B2 | 3/2013 | Shifflette |
| 8,419,609 B2 | 4/2013 | Shambaugh, Jr. et al. |
| 8,449,443 B2 | 5/2013 | Rodefeld et al. |
| 8,480,555 B2 | 7/2013 | Kung |
| 8,485,961 B2 | 7/2013 | Campbell et al. |
| 8,512,012 B2 | 8/2013 | Akdis et al. |
| 8,535,211 B2 | 9/2013 | Campbell et al. |
| 8,545,380 B2 | 10/2013 | Farnan et al. |
| 8,562,508 B2 | 10/2013 | Dague et al. |
| 8,585,572 B2 | 11/2013 | Mehmanesh |
| 8,591,393 B2 | 11/2013 | Walters et al. |
| 8,591,538 B2 | 11/2013 | Gellman |
| 8,591,539 B2 | 11/2013 | Gellman |
| 8,597,170 B2 | 12/2013 | Walters et al. |
| 8,617,239 B2 | 12/2013 | Reitan |
| 8,622,949 B2 | 1/2014 | Zafirelis et al. |
| 8,641,594 B2 | 2/2014 | LaRose et al. |
| 8,657,875 B2 | 2/2014 | Kung et al. |
| 8,684,362 B2 | 4/2014 | Balsells et al. |
| 8,684,904 B2 | 4/2014 | Campbell et al. |
| 8,690,749 B1 | 4/2014 | Nunez |
| 8,721,517 B2 | 5/2014 | Zeng et al. |
| 8,727,959 B2 | 5/2014 | Reitan et al. |
| 8,731,664 B2 | 5/2014 | Foster et al. |
| 8,734,331 B2 | 5/2014 | Evans et al. |
| 8,814,933 B2 | 8/2014 | Siess |
| 8,849,398 B2 | 9/2014 | Evans |
| 8,864,642 B2 | 10/2014 | Scheckel |
| 8,864,643 B2 | 10/2014 | Reichenbach et al. |
| 8,864,644 B2 | 10/2014 | Yomtov |
| 8,882,477 B2 | 11/2014 | Fritz, IV et al. |
| 8,888,728 B2 | 11/2014 | Aboul-Hosn et al. |
| 8,894,387 B2 | 11/2014 | White |
| 8,897,873 B2 | 11/2014 | Schima et al. |
| 8,900,060 B2 | 12/2014 | Liebing |
| 8,900,115 B2 | 12/2014 | Bolling et al. |
| 8,932,246 B2 | 1/2015 | Ferrari |
| 8,992,406 B2 | 3/2015 | Corbett |
| 8,992,407 B2 | 3/2015 | Smith et al. |
| 9,028,216 B2 | 5/2015 | Schumacher et al. |
| 9,028,392 B2 | 5/2015 | Shifflette |
| 9,033,863 B2 | 5/2015 | Jarvik |
| 9,091,271 B2 | 7/2015 | Bourque |
| 9,138,518 B2 | 9/2015 | Campbell et al. |
| 9,144,638 B2 | 9/2015 | Zimmermann et al. |
| 9,162,017 B2 | 10/2015 | Evans et al. |
| 9,192,705 B2 | 11/2015 | Yanai et al. |
| 9,199,020 B2 | 12/2015 | Siess |
| 9,265,870 B2 | 2/2016 | Reichenbach et al. |
| 9,297,735 B2 | 3/2016 | Graichen et al. |
| 9,314,556 B2 | 4/2016 | Tuseth |
| 9,327,067 B2 | 5/2016 | Zeng et al. |
| 9,327,068 B2 | 5/2016 | Aboul-Hosn et al. |
| 9,345,824 B2 | 5/2016 | Mohl et al. |
| 9,370,613 B2 | 6/2016 | Hsu et al. |
| 9,371,826 B2 | 6/2016 | Yanai et al. |
| 9,381,286 B2 | 7/2016 | Spence et al. |
| 9,421,311 B2 | 8/2016 | Tanner et al. |
| 9,433,713 B2 | 9/2016 | Corbett et al. |
| 9,440,013 B2 | 9/2016 | Dowling et al. |
| 9,474,840 B2 | 10/2016 | Siess |
| 9,486,566 B2 | 11/2016 | Siess |
| 9,492,601 B2 | 11/2016 | Casas et al. |
| 9,533,084 B2 | 1/2017 | Siess et al. |
| 9,539,378 B2 | 1/2017 | Tuseth |
| 9,550,017 B2 | 1/2017 | Spanier et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,561,313 B2 | 2/2017 | Taskin |
| 9,561,314 B2 | 2/2017 | Aboul-Hosn et al. |
| 9,579,433 B2 | 2/2017 | LaRose et al. |
| 9,585,991 B2 | 3/2017 | Spence |
| 9,592,397 B2 | 3/2017 | Hansen et al. |
| 9,616,157 B2 | 4/2017 | Akdis |
| 9,623,162 B2 | 4/2017 | Graham et al. |
| 9,623,163 B1 | 4/2017 | Fischi |
| 9,636,442 B2 | 5/2017 | Karmon et al. |
| 9,669,144 B2 | 6/2017 | Spanier et al. |
| 9,675,738 B2 | 6/2017 | Tanner et al. |
| 9,675,739 B2 | 6/2017 | Tanner et al. |
| 9,675,740 B2 | 6/2017 | Zeng et al. |
| 9,682,180 B2 | 6/2017 | Hoarau et al. |
| 9,717,833 B2 | 8/2017 | McBride et al. |
| 9,731,058 B2 | 8/2017 | Siebenhaar et al. |
| 9,759,222 B2 | 9/2017 | Zimmermann et al. |
| 9,770,543 B2 | 9/2017 | Tanner et al. |
| 9,789,238 B2 | 10/2017 | Aboul-Hosn et al. |
| 9,801,990 B2 | 10/2017 | Lynch |
| 9,814,813 B2 | 11/2017 | Corbett |
| 9,821,100 B2 | 11/2017 | Corbett et al. |
| 9,833,550 B2 | 12/2017 | Siess |
| 9,849,223 B2 | 12/2017 | LaRose |
| 9,872,948 B2 | 1/2018 | Siess |
| 9,878,087 B2 | 1/2018 | Richardson et al. |
| 9,907,890 B2 | 3/2018 | Muller |
| 9,919,087 B2 | 3/2018 | Pfeffer et al. |
| 9,950,101 B2 | 4/2018 | Smith et al. |
| 9,968,719 B2 | 5/2018 | Colella |
| 9,999,714 B2 | 6/2018 | Spanier et al. |
| 10,029,037 B2 | 7/2018 | Muller et al. |
| 10,123,875 B2 | 11/2018 | Wildhirt et al. |
| 10,124,102 B2 | 11/2018 | Bulent et al. |
| 10,130,742 B2 | 11/2018 | Tuseth |
| 10,149,932 B2 | 12/2018 | McBride et al. |
| 10,179,197 B2 | 1/2019 | Kaiser et al. |
| 10,201,645 B2 | 2/2019 | Muller |
| 10,207,038 B2 | 2/2019 | Neumann |
| 10,220,129 B2 | 3/2019 | Ayre et al. |
| 10,232,099 B2 | 3/2019 | Peters et al. |
| 10,238,782 B2 | 3/2019 | Barry |
| 10,238,783 B2 | 3/2019 | Aboul-Hosn et al. |
| 10,251,986 B2 | 4/2019 | Larose et al. |
| 10,279,093 B2 | 5/2019 | Reichenbach et al. |
| 10,293,090 B2 | 5/2019 | Bonde et al. |
| 10,300,185 B2 | 5/2019 | Aboul-Hosn et al. |
| 10,300,249 B2 | 5/2019 | Tao et al. |
| 10,322,217 B2 | 6/2019 | Spence |
| 10,342,906 B2 | 7/2019 | D'Ambrosio et al. |
| 10,357,598 B2 | 7/2019 | Aboul-Hosn et al. |
| 10,361,617 B2 | 7/2019 | Mueller et al. |
| 10,371,150 B2 | 8/2019 | Wu et al. |
| 10,376,162 B2 | 8/2019 | Edelman et al. |
| 10,420,869 B2 | 9/2019 | Cornen |
| 10,434,232 B2 | 10/2019 | Wu et al. |
| 10,449,275 B2 | 10/2019 | Corbett |
| 10,449,279 B2 | 10/2019 | Muller |
| 10,478,538 B2 | 11/2019 | Scheckel et al. |
| 10,478,539 B2 | 11/2019 | Pfeffer et al. |
| 10,478,542 B2 | 11/2019 | Jahangir |
| 10,500,323 B2 | 12/2019 | Heuring et al. |
| 10,512,537 B2 | 12/2019 | Corbett et al. |
| 10,525,178 B2 | 1/2020 | Zeng |
| 10,537,670 B2 | 1/2020 | Tuseth et al. |
| 10,537,672 B2 | 1/2020 | Tuseth et al. |
| 10,557,475 B2 | 2/2020 | Roehn |
| 10,561,771 B2 | 2/2020 | Heilman et al. |
| 10,561,772 B2 | 2/2020 | Schumacher |
| 10,576,191 B2 | 3/2020 | LaRose |
| 10,584,589 B2 | 3/2020 | Schumacher et al. |
| 10,589,012 B2 | 3/2020 | Toellner et al. |
| 10,589,013 B2 | 3/2020 | Bourque |
| 10,610,626 B2 | 4/2020 | Spanier et al. |
| 10,617,808 B2 | 4/2020 | Hastie et al. |
| 10,632,241 B2 | 4/2020 | Schenck et al. |
| 10,660,998 B2 | 5/2020 | Hodges |

(56) References Cited

U.S. PATENT DOCUMENTS

| | | |
|---|---|---|
| 10,662,967 B2 | 5/2020 | Scheckel |
| 10,668,195 B2 | 6/2020 | Flores |
| 10,669,855 B2 | 6/2020 | Toellner et al. |
| 10,722,631 B2 | 7/2020 | Salahieh et al. |
| 10,773,002 B2 | 9/2020 | Siess et al. |
| 10,780,208 B2 | 9/2020 | Siess et al. |
| 10,814,053 B2 | 10/2020 | Throckmorton et al. |
| 10,857,273 B2 | 12/2020 | Hodges et al. |
| 10,864,308 B2 | 12/2020 | Muller et al. |
| 11,027,114 B2 | 6/2021 | D'Ambrosio et al. |
| 11,033,729 B2 | 6/2021 | Scheckel et al. |
| 11,045,638 B2 | 6/2021 | Keenan et al. |
| 11,058,863 B2 | 7/2021 | Demou |
| 11,058,865 B2 | 7/2021 | Fitzgerald et al. |
| 11,065,434 B2 | 7/2021 | Egler et al. |
| 11,092,158 B2 | 8/2021 | Siess et al. |
| 11,097,092 B2 | 8/2021 | Siess et al. |
| 11,103,689 B2 | 8/2021 | Siess et al. |
| 11,103,690 B2 | 8/2021 | Epple |
| 11,107,626 B2 | 8/2021 | Siess et al. |
| 11,123,538 B2 | 9/2021 | Epple et al. |
| 11,123,539 B2 | 9/2021 | Pfeffer et al. |
| 11,123,541 B2 | 9/2021 | Corbett et al. |
| 11,129,978 B2 | 9/2021 | Pfeffer et al. |
| 11,141,579 B2 | 10/2021 | Steingräber |
| 11,160,970 B2 | 11/2021 | Muller et al. |
| 11,167,124 B2 | 11/2021 | Pfeffer et al. |
| 11,173,297 B2 | 11/2021 | Muller |
| 11,179,557 B2 | 11/2021 | Georges et al. |
| 11,185,678 B2 | 11/2021 | Smith et al. |
| 11,185,680 B2 | 11/2021 | Tuval et al. |
| 11,191,944 B2 | 12/2021 | Tuval et al. |
| 11,197,989 B2 | 12/2021 | Arslan et al. |
| 11,202,901 B2 | 12/2021 | Barry |
| 11,219,756 B2 | 1/2022 | Tanner et al. |
| 11,229,786 B2 | 1/2022 | Zeng et al. |
| 11,235,138 B2 | 2/2022 | Gross-Hardt et al. |
| 11,235,140 B2 | 2/2022 | Siess et al. |
| 11,241,568 B2 | 2/2022 | Keenan et al. |
| 11,241,569 B2 | 2/2022 | Delgado, III |
| 11,253,693 B2 | 2/2022 | Pfeffer et al. |
| 11,260,212 B2 | 3/2022 | Tuval et al. |
| 11,260,213 B2 | 3/2022 | Zeng et al. |
| 11,260,215 B2 | 3/2022 | Scheckel et al. |
| 11,273,300 B2 | 3/2022 | Schafir |
| 11,273,301 B2 | 3/2022 | Pfeffer et al. |
| 11,278,711 B2 | 3/2022 | Liebing |
| 11,280,345 B2 | 3/2022 | Bredenbreuker et al. |
| 11,285,309 B2 | 3/2022 | Tuval et al. |
| 11,291,824 B2 | 4/2022 | Schwammenthal et al. |
| 11,291,825 B2 | 4/2022 | Tuval et al. |
| 11,291,826 B2 | 4/2022 | Tuval et al. |
| 11,298,519 B2 | 4/2022 | Josephy et al. |
| 11,298,520 B2 | 4/2022 | Schwammenthal et al. |
| 11,298,521 B2 | 4/2022 | Schwammenthal et al. |
| 11,298,523 B2 | 4/2022 | Tuval et al. |
| 11,298,524 B2 | 4/2022 | El Katerji et al. |
| 11,298,525 B2 | 4/2022 | Jahangir |
| 11,305,103 B2 | 4/2022 | Larose et al. |
| 11,305,105 B2 | 4/2022 | Corbett et al. |
| 11,311,711 B2 | 4/2022 | Casas et al. |
| 11,311,712 B2 | 4/2022 | Zeng et al. |
| 11,313,228 B2 | 4/2022 | Schumacher et al. |
| D951,435 S | 5/2022 | Motomura et al. |
| 11,318,295 B2 | 5/2022 | Reyes et al. |
| 11,324,940 B2 | 5/2022 | Earles et al. |
| 11,324,941 B2 | 5/2022 | Xu et al. |
| 11,331,465 B2 | 5/2022 | Epple |
| 11,331,466 B2 | 5/2022 | Keen et al. |
| 11,331,467 B2 | 5/2022 | King et al. |
| 11,331,470 B2 | 5/2022 | Muller et al. |
| 11,338,124 B2 | 5/2022 | Pfeffer et al. |
| 11,338,125 B2 | 5/2022 | Liu et al. |
| 11,344,716 B2 | 5/2022 | Taskin |
| 11,344,717 B2 | 5/2022 | Kallenbach et al. |
| 11,351,356 B2 | 6/2022 | Mohl |
| 11,351,357 B2 | 6/2022 | Mohl |
| 11,351,359 B2 | 6/2022 | Clifton et al. |
| 11,357,967 B2 | 6/2022 | Zeng et al. |
| 11,364,373 B2 | 6/2022 | Corbett et al. |
| 11,368,081 B2 | 6/2022 | Vogt et al. |
| 11,369,785 B2 | 6/2022 | Callaway et al. |
| 11,369,786 B2 | 6/2022 | Menon et al. |
| 11,376,415 B2 | 7/2022 | Mohl |
| 11,389,639 B2 | 7/2022 | Casas |
| 11,389,641 B2 | 7/2022 | Nguyen et al. |
| 11,413,443 B2 | 8/2022 | Hodges et al. |
| 11,413,446 B2 | 8/2022 | Siess et al. |
| 11,415,150 B2 | 8/2022 | Richert et al. |
| 11,421,701 B2 | 8/2022 | Schumacher et al. |
| 11,428,236 B2 | 8/2022 | McBride et al. |
| 11,433,168 B2 | 9/2022 | Wu et al. |
| 11,434,921 B2 | 9/2022 | McBride et al. |
| 11,434,922 B2 | 9/2022 | Roehn |
| 11,446,481 B2 | 9/2022 | Wolman et al. |
| 11,446,482 B2 | 9/2022 | Kirchhoff et al. |
| 11,452,859 B2 | 9/2022 | Earles et al. |
| 11,460,030 B2 | 10/2022 | Shambaugh et al. |
| 11,471,662 B2 | 10/2022 | Akkerman et al. |
| 11,471,663 B2 | 10/2022 | Tuval et al. |
| 11,471,665 B2 | 10/2022 | Clifton et al. |
| 11,478,627 B2 | 10/2022 | Siess et al. |
| 11,478,628 B2 | 10/2022 | Muller et al. |
| 11,478,629 B2 | 10/2022 | Harjes et al. |
| 11,484,698 B2 | 11/2022 | Radman |
| 11,484,699 B2 | 11/2022 | Tuval et al. |
| 11,486,400 B2 | 11/2022 | Schumacher |
| 11,491,320 B2 | 11/2022 | Siess |
| 11,491,322 B2 | 11/2022 | Muller et al. |
| 11,497,896 B2 | 11/2022 | Tanner et al. |
| 11,497,906 B2 | 11/2022 | Grace et al. |
| 11,511,101 B2 | 11/2022 | Hastie et al. |
| 11,511,103 B2 | 11/2022 | Salahieh et al. |
| 11,511,104 B2 | 11/2022 | Dur et al. |
| 11,517,726 B2 | 12/2022 | Siess et al. |
| 11,517,736 B2 | 12/2022 | Earles et al. |
| 11,517,737 B2 | 12/2022 | Struthers et al. |
| 11,517,738 B2 | 12/2022 | Wisniewski |
| 11,517,739 B2 | 12/2022 | Toellner |
| 11,517,740 B2 | 12/2022 | Agarwa et al. |
| 11,524,137 B2 | 12/2022 | Jahangir |
| 11,524,165 B2 | 12/2022 | Tan et al. |
| 11,529,062 B2 | 12/2022 | Moyer et al. |
| 11,534,596 B2 | 12/2022 | Schafir et al. |
| 11,565,103 B2 | 1/2023 | Farago et al. |
| 11,569,015 B2 | 1/2023 | Mourran et al. |
| 11,572,879 B2 | 2/2023 | Mohl |
| 11,577,067 B2 | 2/2023 | Breidall et al. |
| 11,577,068 B2 | 2/2023 | Spence et al. |
| 11,583,659 B2 | 2/2023 | Pfeffer et al. |
| 11,583,670 B2 | 2/2023 | Pfeifer et al. |
| 11,583,671 B2 | 2/2023 | Nguyen et al. |
| 11,583,672 B2 | 2/2023 | Weber et al. |
| 11,590,336 B2 | 2/2023 | Harjes et al. |
| 11,590,337 B2 | 2/2023 | Granegger et al. |
| 11,590,338 B2 | 2/2023 | Barry |
| 11,592,028 B2 | 2/2023 | Schumacher et al. |
| 11,596,727 B2 | 3/2023 | Siess et al. |
| 11,602,627 B2 | 3/2023 | Leonhardt |
| 11,617,876 B2 | 4/2023 | Scheckel et al. |
| 11,628,293 B2 | 4/2023 | Gandhi et al. |
| 11,632,015 B2 | 4/2023 | Sconzert et al. |
| 11,633,586 B2 | 4/2023 | Tanner et al. |
| 11,638,813 B2 | 5/2023 | West |
| 11,639,722 B2 | 5/2023 | Medvedev et al. |
| 11,642,511 B2 | 5/2023 | Delgado, III |
| 11,648,387 B2 | 5/2023 | Schwammenthal et al. |
| 11,648,388 B2 | 5/2023 | Siess et al. |
| 11,648,389 B2 | 5/2023 | Wang et al. |
| 11,648,390 B2 | 5/2023 | Spanier et al. |
| 11,648,391 B2 | 5/2023 | Schwammenthal et al. |
| 11,648,392 B2 | 5/2023 | Tuval et al. |
| 11,648,393 B2 | 5/2023 | Taskin et al. |
| 11,654,273 B2 | 5/2023 | Granegger et al. |

(56) References Cited

U.S. PATENT DOCUMENTS

| | | |
|---|---|---|
| 11,654,275 B2 | 5/2023 | Brandt |
| 11,654,276 B2 | 5/2023 | Fitzgerald et al. |
| 11,660,441 B2 | 5/2023 | Fitzgerald et al. |
| 11,666,747 B2 | 6/2023 | Tuval et al. |
| 11,666,748 B2 | 6/2023 | Kronstedt et al. |
| 11,668,321 B2 | 6/2023 | Richert et al. |
| 11,674,517 B2 | 6/2023 | Mohl |
| 11,679,234 B2 | 6/2023 | King et al. |
| 11,679,249 B2 | 6/2023 | Scheckel et al. |
| 11,684,275 B2 | 6/2023 | Tuval et al. |
| 11,684,769 B2 | 6/2023 | Harjes et al. |
| 11,690,521 B2 | 7/2023 | Tuval et al. |
| 11,690,996 B2 | 7/2023 | Siess et al. |
| 11,697,016 B2 | 7/2023 | Epple |
| 11,701,510 B2 | 7/2023 | Demou |
| 11,702,938 B2 | 7/2023 | Schumacher et al. |
| 11,703,064 B2 | 7/2023 | Bredenbreuker et al. |
| 11,708,833 B2 | 7/2023 | McBride et al. |
| 11,744,987 B2 | 9/2023 | Siess et al. |
| 11,745,005 B2 | 9/2023 | Delgado, III |
| 11,746,906 B1 | 9/2023 | Balta et al. |
| 11,752,322 B2 | 9/2023 | Aboulhosn et al. |
| 11,752,323 B2 | 9/2023 | Edwards et al. |
| 11,754,075 B2 | 9/2023 | Schuelke et al. |
| 11,754,077 B1 | 9/2023 | Mohl |
| 11,759,612 B2 | 9/2023 | Tanner et al. |
| 11,759,622 B2 | 9/2023 | Siess et al. |
| 11,766,555 B2 | 9/2023 | Matthes et al. |
| 11,771,884 B2 | 10/2023 | Siess et al. |
| 11,771,885 B2 | 10/2023 | Liu et al. |
| 11,779,234 B2 | 10/2023 | Harjes et al. |
| 11,779,751 B2 | 10/2023 | Earles et al. |
| 11,781,551 B2 | 10/2023 | Yanai et al. |
| 11,786,386 B2 | 10/2023 | Brady et al. |
| 11,786,700 B2 | 10/2023 | Pfeffer et al. |
| 11,786,720 B2 | 10/2023 | Muller |
| 11,793,994 B2 | 10/2023 | Josephy et al. |
| 11,804,767 B2 | 10/2023 | Vogt et al. |
| 11,806,116 B2 | 11/2023 | Tuval et al. |
| 11,806,117 B2 | 11/2023 | Tuval et al. |
| 11,806,517 B2 | 11/2023 | Petersen |
| 11,806,518 B2 | 11/2023 | Michelena et al. |
| 11,813,443 B2 | 11/2023 | Hanson et al. |
| 11,813,444 B2 | 11/2023 | Siess et al. |
| 11,819,678 B2 | 11/2023 | Siess et al. |
| 11,826,127 B2 | 11/2023 | Casas |
| 11,833,278 B2 | 12/2023 | Siess et al. |
| 11,833,342 B2 | 12/2023 | Tanner et al. |
| 11,839,754 B2 | 12/2023 | Tuval et al. |
| 11,844,592 B2 | 12/2023 | Tuval et al. |
| 11,844,940 B2 | 12/2023 | D'Ambrosio et al. |
| 11,850,412 B2 | 12/2023 | Grauwinkel et al. |
| 11,850,413 B2 | 12/2023 | Zeng et al. |
| 11,850,414 B2 | 12/2023 | Schenck et al. |
| 11,850,415 B2 | 12/2023 | Schwammenthal et al. |
| 11,857,743 B2 | 1/2024 | Fantuzzi et al. |
| 11,857,777 B2 | 1/2024 | Earles et al. |
| 11,865,238 B2 | 1/2024 | Siess et al. |
| 11,872,384 B2 | 1/2024 | Cotter |
| 11,883,005 B2 | 1/2024 | Golden et al. |
| 11,883,207 B2 | 1/2024 | El Katerji et al. |
| 11,883,310 B2 | 1/2024 | Nolan et al. |
| 11,883,641 B2 | 1/2024 | Dur et al. |
| 11,890,212 B2 | 2/2024 | Gilmartin et al. |
| 11,896,482 B2 | 2/2024 | Delaloye et al. |
| 11,898,642 B2 | 2/2024 | Stanton et al. |
| 11,904,104 B2 | 2/2024 | Jahangir |
| 11,911,579 B2 | 2/2024 | Tanner et al. |
| 11,918,470 B2 | 3/2024 | Jarral et al. |
| 11,918,496 B2 | 3/2024 | Folan |
| 11,918,726 B2 | 3/2024 | Siess et al. |
| 11,918,800 B2 | 3/2024 | Muller et al. |
| 11,925,356 B2 | 3/2024 | Anderson et al. |
| 11,925,570 B2 | 3/2024 | Lydecker et al. |
| 11,925,794 B2 | 3/2024 | Malkin et al. |
| 11,925,795 B2 | 3/2024 | Muller et al. |
| 11,925,796 B2 | 3/2024 | Tanner et al. |
| 11,925,797 B2 | 3/2024 | Tanner et al. |
| 11,938,311 B2 | 3/2024 | Corbett et al. |
| 11,944,805 B2 | 4/2024 | Stotz |
| 11,957,892 B2 | 4/2024 | Siess et al. |
| 11,980,385 B2 | 5/2024 | Haselman |
| 11,986,604 B2 | 5/2024 | Siess |
| 12,005,248 B2 | 6/2024 | Vogt et al. |
| 12,011,583 B2 | 6/2024 | Wang |
| 12,017,058 B2 | 6/2024 | Kerkhoffs et al. |
| 12,023,476 B2 | 7/2024 | Tuval et al. |
| 12,023,477 B2 | 7/2024 | Siess |
| 12,059,559 B2 | 8/2024 | Muller et al. |
| 12,064,120 B2 | 8/2024 | Hajjar et al. |
| 12,064,611 B2 | 8/2024 | D'Ambrosio et al. |
| 12,064,614 B2 | 8/2024 | Agah et al. |
| 12,064,615 B2 | 8/2024 | Stotz et al. |
| 12,064,616 B2 | 8/2024 | Spanier et al. |
| 12,076,544 B2 | 9/2024 | Siess et al. |
| 12,076,549 B2 | 9/2024 | Stotz et al. |
| 12,076,550 B2 | 9/2024 | Edwards et al. |
| 12,090,314 B2 | 9/2024 | Tuval et al. |
| 12,092,114 B2 | 9/2024 | Siess |
| 12,097,016 B2 | 9/2024 | Goldvasser |
| 12,102,815 B2 | 10/2024 | Dhaliwal et al. |
| 12,104,600 B2 | 10/2024 | Mohl |
| 12,107,474 B2 | 10/2024 | Vollmer |
| 12,117,007 B1 | 10/2024 | Mohl |
| 12,121,713 B2 | 10/2024 | Calomeni et al. |
| 12,133,976 B2 | 11/2024 | Malone et al. |
| 12,144,936 B2 | 11/2024 | Tao et al. |
| 12,144,976 B2 | 11/2024 | Baumbach et al. |
| 12,161,854 B2 | 12/2024 | Earles et al. |
| 12,161,855 B2 | 12/2024 | Hastie et al. |
| 12,161,857 B2 | 12/2024 | Saul et al. |
| 12,171,993 B2 | 12/2024 | Higgins et al. |
| 12,194,287 B2 | 1/2025 | Kassel et al. |
| 12,196,210 B2 | 1/2025 | Siess et al. |
| 12,201,823 B2 | 1/2025 | Baumbach et al. |
| 12,207,906 B2 | 1/2025 | Tuval et al. |
| 12,213,771 B2 | 2/2025 | Curran et al. |
| 12,233,251 B2 | 2/2025 | Siess et al. |
| 12,241,480 B2 | 3/2025 | Corbett et al. |
| 12,263,330 B2 | 4/2025 | D'Ambrosio et al. |
| 12,263,333 B2 | 4/2025 | Stotz et al. |
| 12,263,334 B2 | 4/2025 | Corbett et al. |
| 12,268,861 B2 | 4/2025 | D'Ambrosio et al. |
| 12,290,673 B2 | 5/2025 | Jahangir |
| 12,290,676 B2 | 5/2025 | Farago et al. |
| 12,303,678 B2 | 5/2025 | Kerkhoffs et al. |
| 12,303,680 B2 | 5/2025 | Siess et al. |
| 12,318,551 B2 | 6/2025 | Jahangir |
| 12,329,958 B2 | 6/2025 | Siess et al. |
| 12,337,163 B2 | 6/2025 | Radman |
| 12,343,516 B2 | 7/2025 | Cook |
| 12,343,518 B2 | 7/2025 | Tuval et al. |
| 12,343,519 B2 | 7/2025 | Siess et al. |
| 12,364,799 B2 | 7/2025 | Siess et al. |
| 12,364,850 B2 | 7/2025 | Siess et al. |
| 12,364,854 B2 | 7/2025 | Wang |
| 12,383,727 B2 | 8/2025 | Kassel et al. |
| 2001/0009645 A1 | 7/2001 | Noda |
| 2001/0041934 A1 | 11/2001 | Yamazaki et al. |
| 2002/0076322 A1 | 6/2002 | Maeda et al. |
| 2002/0082585 A1 | 6/2002 | Carroll et al. |
| 2002/0147495 A1 | 10/2002 | Petroff |
| 2002/0153664 A1 | 10/2002 | Schroeder |
| 2003/0060685 A1 | 3/2003 | Houser |
| 2003/0091450 A1 | 5/2003 | Davis et al. |
| 2003/0100816 A1 | 5/2003 | Siess |
| 2003/0111800 A1 | 6/2003 | Kreutzer |
| 2003/0139643 A1 | 7/2003 | Smith et al. |
| 2003/0191357 A1 | 10/2003 | Frazier |
| 2003/0199727 A1 | 10/2003 | Burke |
| 2004/0044266 A1 | 3/2004 | Siess et al. |
| 2004/0102674 A1 | 5/2004 | Zadini et al. |
| 2004/0115038 A1 | 6/2004 | Nuesser et al. |
| 2004/0167376 A1 | 8/2004 | Peters et al. |

(56) References Cited

U.S. PATENT DOCUMENTS

| | | |
|---|---|---|
| 2004/0234391 A1 | 11/2004 | Izraelev |
| 2004/0241019 A1 | 12/2004 | Goldowsky |
| 2004/0260346 A1 | 12/2004 | Overall et al. |
| 2005/0006083 A1 | 1/2005 | Chen et al. |
| 2005/0008509 A1 | 1/2005 | Chang |
| 2005/0019167 A1 | 1/2005 | Nusser et al. |
| 2005/0085683 A1 | 4/2005 | Bolling et al. |
| 2005/0220636 A1 | 10/2005 | Henein et al. |
| 2005/0254976 A1 | 11/2005 | Carrier et al. |
| 2006/0030809 A1 | 2/2006 | Barzilay et al. |
| 2006/0062672 A1 | 3/2006 | McBride et al. |
| 2006/0155158 A1 | 7/2006 | Aboul-Hosn |
| 2006/0224110 A1 | 10/2006 | Scott et al. |
| 2006/0276682 A1 | 12/2006 | Bolling et al. |
| 2007/0004959 A1 | 1/2007 | Carrier et al. |
| 2007/0142696 A1 | 6/2007 | Crosby et al. |
| 2007/0156006 A1 | 7/2007 | Smith et al. |
| 2008/0015517 A1 | 1/2008 | Geistert et al. |
| 2008/0058925 A1 | 3/2008 | Cohen |
| 2008/0086027 A1 | 4/2008 | Siess et al. |
| 2008/0114339 A1 | 5/2008 | McBride et al. |
| 2008/0262289 A1 | 10/2008 | Goldowsky |
| 2008/0292478 A1 | 11/2008 | Baykut et al. |
| 2008/0306328 A1 | 12/2008 | Ercolani |
| 2009/0004037 A1 | 1/2009 | Ito |
| 2009/0112312 A1 | 4/2009 | Larose et al. |
| 2009/0203957 A1 | 8/2009 | LaRose et al. |
| 2009/0204205 A1 | 8/2009 | Larose et al. |
| 2010/0041939 A1 | 2/2010 | Siess |
| 2010/0082099 A1 | 4/2010 | Vodermayer et al. |
| 2010/0191035 A1 | 7/2010 | Kang et al. |
| 2010/0268017 A1 | 10/2010 | Siess |
| 2010/0298625 A1 | 11/2010 | Reichenbach et al. |
| 2011/0172505 A1 | 7/2011 | Kim |
| 2011/0184224 A1 | 7/2011 | Garrigue |
| 2011/0230821 A1 | 9/2011 | Babic |
| 2011/0237863 A1 | 9/2011 | Ricci et al. |
| 2011/0238172 A1 | 9/2011 | Akdis |
| 2012/0029265 A1 | 2/2012 | LaRose |
| 2012/0035645 A1 | 2/2012 | Gross |
| 2012/0088954 A1 | 4/2012 | Foster |
| 2012/0093628 A1 | 4/2012 | Liebing |
| 2012/0134793 A1 | 5/2012 | Wu et al. |
| 2012/0172655 A1 | 7/2012 | Campbell et al. |
| 2012/0178986 A1 | 7/2012 | Campbell et al. |
| 2012/0245404 A1 | 9/2012 | Smith |
| 2012/0247200 A1 | 10/2012 | Ahonen et al. |
| 2012/0283506 A1 | 11/2012 | Meister et al. |
| 2012/0310036 A1 | 12/2012 | Peters et al. |
| 2013/0053623 A1 | 2/2013 | Evans |
| 2013/0085318 A1 | 4/2013 | Toellner |
| 2013/0209292 A1 | 8/2013 | Baykut et al. |
| 2013/0281761 A1 | 10/2013 | Kapur |
| 2013/0289376 A1 | 10/2013 | Lang |
| 2013/0303830 A1 | 11/2013 | Zeng et al. |
| 2013/0303831 A1 | 11/2013 | Evans |
| 2013/0303832 A1 | 11/2013 | Wampler |
| 2013/0330219 A1 | 12/2013 | LaRose et al. |
| 2014/0005467 A1 | 1/2014 | Farnan et al. |
| 2014/0030122 A1 | 1/2014 | Ozaki |
| 2014/0051908 A1 | 2/2014 | Khanal et al. |
| 2014/0079557 A1 | 3/2014 | LaRose et al. |
| 2014/0107399 A1 | 4/2014 | Spence |
| 2014/0167545 A1 | 6/2014 | Bremner et al. |
| 2014/0194717 A1 | 7/2014 | Wildhirt et al. |
| 2014/0200389 A1 | 7/2014 | Yanai et al. |
| 2014/0207232 A1 | 7/2014 | Garrigue |
| 2014/0275721 A1 | 9/2014 | Yanai et al. |
| 2014/0330069 A1 | 11/2014 | Hastings et al. |
| 2014/0341726 A1 | 11/2014 | Wu et al. |
| 2014/0368942 A1 | 12/2014 | Harrell |
| 2015/0031936 A1 | 1/2015 | LaRose et al. |
| 2015/0051435 A1 | 2/2015 | Siess et al. |
| 2015/0051438 A1 | 2/2015 | Taskin |
| 2015/0080743 A1 | 3/2015 | Siess |
| 2015/0099923 A1 | 4/2015 | Magovern et al. |
| 2015/0141842 A1 | 5/2015 | Spanier et al. |
| 2015/0171694 A1 | 6/2015 | Dallas |
| 2015/0190092 A1 | 7/2015 | Mori |
| 2015/0273184 A1 | 10/2015 | Scott et al. |
| 2015/0290372 A1 | 10/2015 | Muller et al. |
| 2015/0290373 A1 | 10/2015 | Rudser et al. |
| 2015/0306291 A1 | 10/2015 | Bonde et al. |
| 2015/0343179 A1 | 12/2015 | Schumacher et al. |
| 2015/0362017 A1 | 12/2015 | Bell |
| 2015/0365738 A1 | 12/2015 | Purvis et al. |
| 2016/0008531 A1 | 1/2016 | Wang et al. |
| 2016/0030649 A1 | 2/2016 | Zeng |
| 2016/0038663 A1 | 2/2016 | Taskin et al. |
| 2016/0045654 A1 | 2/2016 | Connor |
| 2016/0067395 A1 | 3/2016 | Jimenez et al. |
| 2016/0101224 A1 | 4/2016 | Akkerman |
| 2016/0144089 A1 | 5/2016 | Woo et al. |
| 2016/0144166 A1 | 5/2016 | Decré et al. |
| 2016/0166747 A1 | 6/2016 | Frazier et al. |
| 2016/0213828 A1 | 7/2016 | Sievers |
| 2016/0223086 A1 | 8/2016 | Balsells et al. |
| 2016/0256620 A1 | 9/2016 | Scheckel et al. |
| 2016/0279311 A1 | 9/2016 | Cecere et al. |
| 2016/0367739 A1 | 12/2016 | Wiesener et al. |
| 2016/0375187 A1 | 12/2016 | Lee et al. |
| 2017/0021069 A1 | 1/2017 | Hodges |
| 2017/0021074 A1 | 1/2017 | Opfermann et al. |
| 2017/0035952 A1 | 2/2017 | Muller |
| 2017/0043074 A1 | 2/2017 | Siess |
| 2017/0049947 A1 | 2/2017 | Corbett et al. |
| 2017/0080136 A1 | 3/2017 | Janeczek et al. |
| 2017/0087286 A1 | 3/2017 | Spanier et al. |
| 2017/0087288 A1 | 3/2017 | Groß-Hardt et al. |
| 2017/0128644 A1 | 5/2017 | Foster |
| 2017/0136225 A1 | 5/2017 | Siess et al. |
| 2017/0143952 A1 | 5/2017 | Siess et al. |
| 2017/0157309 A1 | 6/2017 | Begg et al. |
| 2017/0209633 A1 | 7/2017 | Cohen |
| 2017/0232169 A1 | 8/2017 | Muller |
| 2017/0274128 A1 | 9/2017 | Tamburino et al. |
| 2017/0317573 A1 | 11/2017 | Mueller et al. |
| 2017/0333607 A1 | 11/2017 | Zarins |
| 2017/0333608 A1 | 11/2017 | Zeng |
| 2017/0340787 A1 | 11/2017 | Corbett et al. |
| 2017/0340788 A1 | 11/2017 | Korakianitis et al. |
| 2017/0340789 A1 | 11/2017 | Bonde et al. |
| 2017/0343043 A1 | 11/2017 | Walsh et al. |
| 2018/0015214 A1 | 1/2018 | Lynch |
| 2018/0021494 A1 | 1/2018 | Muller et al. |
| 2018/0021495 A1 | 1/2018 | Muller et al. |
| 2018/0050141 A1 | 2/2018 | Corbett et al. |
| 2018/0055979 A1 | 3/2018 | Corbett et al. |
| 2018/0064860 A1 | 3/2018 | Nunez et al. |
| 2018/0093070 A1 | 4/2018 | Cottone |
| 2018/0099076 A1 | 4/2018 | LaRose |
| 2018/0110907 A1 | 4/2018 | Keenan et al. |
| 2018/0133379 A1 | 5/2018 | Farnan et al. |
| 2018/0154058 A1 | 6/2018 | Menon et al. |
| 2018/0169312 A1 | 6/2018 | Barry |
| 2018/0169313 A1 | 6/2018 | Schwammenthal et al. |
| 2018/0207336 A1 | 7/2018 | Solem |
| 2018/0219452 A1 | 8/2018 | Boisclair |
| 2018/0221551 A1 | 8/2018 | Tanner et al. |
| 2018/0221553 A1 | 8/2018 | Taskin |
| 2018/0228950 A1 | 8/2018 | Janeczek et al. |
| 2018/0228953 A1 | 8/2018 | Siess et al. |
| 2018/0243004 A1 | 8/2018 | von Segesser et al. |
| 2018/0243489 A1 | 8/2018 | Haddadi |
| 2018/0250456 A1 | 9/2018 | Nitzan et al. |
| 2018/0256797 A1 | 9/2018 | Schenck et al. |
| 2018/0280598 A1 | 10/2018 | Curran et al. |
| 2018/0289877 A1 | 10/2018 | Schumacher et al. |
| 2018/0303990 A1 | 10/2018 | Siess et al. |
| 2018/0303991 A1 | 10/2018 | Nüsser et al. |
| 2018/0311421 A1 | 11/2018 | Tuseth |
| 2018/0311423 A1 | 11/2018 | Zeng et al. |
| 2018/0318483 A1 | 11/2018 | Dague et al. |
| 2018/0318547 A1 | 11/2018 | Yokoyama |

(56) References Cited

U.S. PATENT DOCUMENTS

| | | |
|---|---|---|
| 2018/0326132 A1 | 11/2018 | Maimon et al. |
| 2018/0333059 A1 | 11/2018 | Casas |
| 2018/0335037 A1 | 11/2018 | Shambaugh et al. |
| 2018/0345028 A1 | 12/2018 | Aboud et al. |
| 2018/0361042 A1 | 12/2018 | Fitzgerald et al. |
| 2018/0369469 A1 | 12/2018 | Le Duc De Lillers et al. |
| 2019/0001034 A1 | 1/2019 | Taskin et al. |
| 2019/0004037 A1 | 1/2019 | Zhang et al. |
| 2019/0030228 A1 | 1/2019 | Keenan et al. |
| 2019/0046702 A1 | 2/2019 | Siess et al. |
| 2019/0046703 A1 | 2/2019 | Shambaugh et al. |
| 2019/0054223 A1 | 2/2019 | Frazier et al. |
| 2019/0060539 A1 | 2/2019 | Siess et al. |
| 2019/0060543 A1 | 2/2019 | Khanal et al. |
| 2019/0076167 A1 | 3/2019 | Fantuzzi et al. |
| 2019/0083690 A1 | 3/2019 | Siess et al. |
| 2019/0099532 A1 | 4/2019 | Er |
| 2019/0101130 A1 | 4/2019 | Bredenbreuker et al. |
| 2019/0105437 A1 | 4/2019 | Siess et al. |
| 2019/0117865 A1 | 4/2019 | Walters et al. |
| 2019/0125948 A1 | 5/2019 | Stanfield et al. |
| 2019/0143016 A1 | 5/2019 | Corbett et al. |
| 2019/0143018 A1 | 5/2019 | Salahieh et al. |
| 2019/0154053 A1 | 5/2019 | McBride et al. |
| 2019/0167122 A1 | 6/2019 | Obermiller et al. |
| 2019/0167875 A1 | 6/2019 | Simon et al. |
| 2019/0167878 A1 | 6/2019 | Rowe |
| 2019/0170153 A1 | 6/2019 | Scheckel |
| 2019/0175806 A1 | 6/2019 | Tuval et al. |
| 2019/0184078 A1 | 6/2019 | Zilbershlag et al. |
| 2019/0184080 A1 | 6/2019 | Mohl |
| 2019/0192752 A1 | 6/2019 | Tiller et al. |
| 2019/0199165 A1 | 6/2019 | Carson |
| 2019/0201603 A1 | 7/2019 | Siess et al. |
| 2019/0209755 A1 | 7/2019 | Nix et al. |
| 2019/0209758 A1 | 7/2019 | Tuval et al. |
| 2019/0211836 A1 | 7/2019 | Schumacher et al. |
| 2019/0211846 A1 | 7/2019 | Liebing |
| 2019/0211847 A1 | 7/2019 | Walsh et al. |
| 2019/0223877 A1 | 7/2019 | Nitzen et al. |
| 2019/0269840 A1 | 9/2019 | Tuval et al. |
| 2019/0275224 A1 | 9/2019 | Hanson et al. |
| 2019/0282741 A1 | 9/2019 | Franano et al. |
| 2019/0282744 A1 | 9/2019 | D'Ambrosio et al. |
| 2019/0282746 A1 | 9/2019 | Judisch |
| 2019/0290817 A1 | 9/2019 | Guo et al. |
| 2019/0298902 A1 | 10/2019 | Siess et al. |
| 2019/0316591 A1 | 10/2019 | Toellner |
| 2019/0321527 A1 | 10/2019 | King et al. |
| 2019/0321529 A1 | 10/2019 | Korakianitis et al. |
| 2019/0321531 A1 | 10/2019 | Cambronne et al. |
| 2019/0336664 A1 | 11/2019 | Liebing |
| 2019/0344000 A1 | 11/2019 | Kushwaha et al. |
| 2019/0344001 A1* | 11/2019 | Salahieh ............ A61M 60/824 |
| 2019/0351117 A1 | 11/2019 | Cambronne et al. |
| 2019/0351119 A1 | 11/2019 | Cambronne et al. |
| 2019/0351120 A1 | 11/2019 | Kushwaha et al. |
| 2019/0358378 A1 | 11/2019 | Schumacher |
| 2019/0358379 A1 | 11/2019 | Wiessler et al. |
| 2019/0358384 A1 | 11/2019 | Epple |
| 2019/0365975 A1 | 12/2019 | Muller et al. |
| 2019/0383298 A1 | 12/2019 | Toellner |
| 2020/0016309 A1 | 1/2020 | Kallenbach et al. |
| 2020/0023109 A1 | 1/2020 | Epple |
| 2020/0030507 A1* | 1/2020 | Higgins ............. A61M 60/216 |
| 2020/0030509 A1 | 1/2020 | Siess et al. |
| 2020/0030510 A1 | 1/2020 | Higgins |
| 2020/0030511 A1 | 1/2020 | Higgins |
| 2020/0030512 A1 | 1/2020 | Higgins et al. |
| 2020/0038567 A1 | 2/2020 | Siess et al. |
| 2020/0038568 A1 | 2/2020 | Higgins et al. |
| 2020/0038571 A1 | 2/2020 | Jahangir |
| 2020/0069857 A1 | 3/2020 | Schwammenthal et al. |
| 2020/0088207 A1 | 3/2020 | Schumacher et al. |
| 2020/0114053 A1 | 4/2020 | Salahieh et al. |
| 2020/0129684 A1 | 4/2020 | Pfeffer et al. |
| 2020/0139028 A1 | 5/2020 | Scheckel et al. |
| 2020/0139029 A1 | 5/2020 | Scheckel et al. |
| 2020/0147283 A1 | 5/2020 | Tanner et al. |
| 2020/0164125 A1 | 5/2020 | Muller et al. |
| 2020/0164126 A1 | 5/2020 | Muller |
| 2020/0261633 A1 | 8/2020 | Spanier |
| 2020/0345337 A1 | 11/2020 | Muller et al. |
| 2021/0052793 A1 | 2/2021 | Struthers et al. |
| 2021/0236803 A1 | 8/2021 | Stotz |
| 2021/0268264 A1 | 9/2021 | Stotz |
| 2021/0290929 A1 | 9/2021 | Stotz |
| 2021/0290930 A1 | 9/2021 | Kasel |
| 2021/0290932 A1 | 9/2021 | Stotz |
| 2021/0290937 A1 | 9/2021 | Baumbach |
| 2021/0313869 A1 | 10/2021 | Strasswiemer et al. |
| 2021/0316133 A1 | 10/2021 | Kassel et al. |
| 2021/0322756 A1 | 10/2021 | Vollmer et al. |
| 2021/0330958 A1 | 10/2021 | Stotz et al. |
| 2021/0338999 A1 | 11/2021 | Stotz et al. |
| 2021/0339004 A1 | 11/2021 | Schlebusch et al. |
| 2021/0339005 A1 | 11/2021 | Stotz et al. |
| 2021/0346678 A1 | 11/2021 | Baumbach et al. |
| 2021/0346680 A1 | 11/2021 | Vogt et al. |
| 2021/0379352 A1 | 12/2021 | Schlebusch et al. |
| 2021/0379355 A1 | 12/2021 | Schuelke et al. |
| 2021/0379358 A1 | 12/2021 | Schuelke et al. |
| 2021/0384812 A1 | 12/2021 | Vollmer et al. |
| 2022/0008714 A1 | 1/2022 | Stotz |
| 2022/0016411 A1 | 1/2022 | Winterwerber |
| 2022/0072296 A1 | 3/2022 | Mori |
| 2022/0072297 A1 | 3/2022 | Tuval et al. |
| 2022/0080178 A1 | 3/2022 | Salahieh et al. |
| 2022/0080180 A1 | 3/2022 | Siess et al. |
| 2022/0080182 A1 | 3/2022 | Earles et al. |
| 2022/0080183 A1 | 3/2022 | Earles et al. |
| 2022/0080184 A1 | 3/2022 | Clifton et al. |
| 2022/0080185 A1 | 3/2022 | Clifton et al. |
| 2022/0105337 A1 | 4/2022 | Salahieh et al. |
| 2022/0105339 A1 | 4/2022 | Nix et al. |
| 2022/0126083 A1 | 4/2022 | Grauwinkel et al. |
| 2022/0161018 A1 | 5/2022 | Mitze et al. |
| 2022/0161019 A1 | 5/2022 | Mitze et al. |
| 2022/0161021 A1 | 5/2022 | Mitze et al. |
| 2022/0241580 A1 | 8/2022 | Stotz et al. |
| 2022/0249829 A1 | 8/2022 | Edwards et al. |
| 2022/0323742 A1 | 10/2022 | Grauwinkel et al. |
| 2022/0407403 A1 | 12/2022 | Vogt et al. |
| 2023/0001178 A1 | 1/2023 | Corbett et al. |
| 2023/0063798 A1 | 3/2023 | Edwards et al. |
| 2023/0079625 A1 | 3/2023 | Theran et al. |
| 2023/0105131 A1 | 4/2023 | Kerkhoffs et al. |
| 2023/0125439 A1 | 4/2023 | Malone et al. |
| 2023/0128328 A1 | 4/2023 | Malone et al. |
| 2023/0130285 A1 | 4/2023 | Malone et al. |
| 2023/0149691 A1 | 5/2023 | VanCamp et al. |
| 2023/0149692 A1 | 5/2023 | Larsen et al. |
| 2023/0158289 A1 | 5/2023 | Breidall et al. |
| 2023/0277833 A1 | 9/2023 | Sharma et al. |
| 2023/0277836 A1 | 9/2023 | Schellenberg et al. |
| 2023/0293878 A1 | 9/2023 | Christof et al. |
| 2024/0075277 A1 | 3/2024 | Schellenberg |
| 2024/0102475 A1 | 3/2024 | Schuelke et al. |
| 2024/0198084 A1 | 6/2024 | Stotz |
| 2024/0245902 A1 | 7/2024 | Schlebusch et al. |
| 2024/0269459 A1 | 8/2024 | Schellenberg et al. |
| 2024/0277998 A1 | 8/2024 | Vogt et al. |
| 2024/0285935 A1 | 8/2024 | Popov et al. |
| 2024/0335651 A1 | 10/2024 | Mitze et al. |
| 2024/0399135 A1 | 12/2024 | Stotz et al. |
| 2025/0032773 A1 | 1/2025 | Baumbach et al. |
| 2025/0121177 A1 | 4/2025 | West |
| 2025/0144397 A1 | 5/2025 | Kassel et al. |

(56) References Cited

U.S. PATENT DOCUMENTS

| | | | |
|---|---|---|---|
| 2025/0161660 A1 | 5/2025 | Baumbach et al. | |
| 2025/0170388 A1 | 5/2025 | Kerkhoffs et al. | |

FOREIGN PATENT DOCUMENTS

| | | |
|---|---|---|
| AU | 2012261669 | 1/2013 |
| AU | 2013203301 | 5/2013 |
| AU | 2013273663 | 1/2014 |
| BR | PI0904483-3 | 7/2011 |
| CA | 2 026 692 | 4/1992 |
| CA | 2 026 693 | 4/1992 |
| CA | 2 292 432 | 5/1998 |
| CA | 2 664 835 | 2/2008 |
| CA | 2 796 357 | 10/2011 |
| CA | 2 947 984 | 11/2022 |
| CN | 1222862 A | 7/1999 |
| CN | 1254598 A | 5/2000 |
| CN | 1376523 A | 10/2002 |
| CN | 2535055 | 2/2003 |
| CN | 1118304 C | 8/2003 |
| CN | 2616217 | 5/2004 |
| CN | 1202871 C | 5/2005 |
| CN | 1833736 A | 9/2006 |
| CN | 200977306 | 11/2007 |
| CN | 101112628 | 1/2008 |
| CN | 101128168 | 2/2008 |
| CN | 201150675 | 11/2008 |
| CN | 101677812 | 3/2010 |
| CN | 201437016 | 4/2010 |
| CN | 201618200 | 11/2010 |
| CN | 201658687 | 12/2010 |
| CN | 201710717 | 1/2011 |
| CN | 201894758 | 7/2011 |
| CN | 102475923 | 5/2012 |
| CN | 102545538 | 7/2012 |
| CN | 202314596 | 7/2012 |
| CN | 102743801 | 10/2012 |
| CN | 103143072 | 6/2013 |
| CN | 103845766 | 6/2014 |
| CN | 103861162 | 6/2014 |
| CN | 103915980 | 7/2014 |
| CN | 203809157 | 9/2014 |
| CN | 203842087 | 9/2014 |
| CN | 104208763 | 12/2014 |
| CN | 104208764 | 12/2014 |
| CN | 203971004 | 12/2014 |
| CN | 104274873 | 1/2015 |
| CN | 204106671 | 1/2015 |
| CN | 204219479 | 3/2015 |
| CN | 103877630 | 2/2016 |
| CN | 205215814 | 5/2016 |
| CN | 103977464 | 8/2016 |
| CN | 104162192 | 9/2016 |
| CN | 104888293 | 3/2017 |
| CN | 106512117 | 3/2017 |
| CN | 104225696 | 6/2017 |
| CN | 107019824 | 8/2017 |
| CN | 206443963 | 8/2017 |
| CN | 107281567 | 10/2017 |
| CN | 104707194 | 11/2017 |
| CN | 107921187 | 4/2018 |
| CN | 105498002 | 6/2018 |
| CN | 106310410 | 7/2018 |
| CN | 106902404 | 8/2019 |
| CN | 209790495 | 12/2019 |
| CN | 110665079 | 1/2020 |
| CN | 210020563 | 2/2020 |
| CN | 111166948 | 5/2020 |
| CN | 111166949 | 5/2020 |
| CN | 215841206 | 2/2022 |
| CN | 217828630 | 11/2022 |
| CN | 218922664 | 4/2023 |
| CN | 116077106 | 5/2023 |
| CN | 116365757 | 6/2023 |
| CN | 219250364 | 6/2023 |
| CN | 116785582 | 9/2023 |
| CN | 116531654 | 11/2023 |
| CN | 116440404 | 3/2024 |
| CN | 117018427 | 3/2024 |
| CN | 117482377 | 4/2024 |
| CN | 118320293 | 7/2024 |
| CN | 118320294 | 7/2024 |
| CN | 113769260 | 9/2024 |
| CN | 118142074 | 9/2024 |
| CN | 118681125 | 9/2024 |
| CN | 118899971 | 11/2024 |
| DE | 1 001 642 | 1/1957 |
| DE | 1 165 144 | 3/1964 |
| DE | 27 07 951 | 9/1977 |
| DE | 26 24 058 | 12/1977 |
| DE | 3 545 214 | 7/1986 |
| DE | 41 05 278 | 8/1992 |
| DE | 195 46 336 | 5/1997 |
| DE | 695 01 834 | 10/1998 |
| DE | 198 54 724 | 5/1999 |
| DE | 198 21 307 | 10/1999 |
| DE | 199 10 872 | 10/1999 |
| DE | 199 56 380 | 11/1999 |
| DE | 100 59 714 | 5/2002 |
| DE | 103 45 694 | 4/2005 |
| DE | 697 31 709 | 4/2005 |
| DE | 101 55 011 | 11/2005 |
| DE | 601 19 592 | 9/2006 |
| DE | 11 2004 001 809 | 11/2006 |
| DE | 20 2005 020 288 | 6/2007 |
| DE | 10 2006 019 206 | 10/2007 |
| DE | 10 2006 036 948 | 2/2008 |
| DE | 10 2008 060 357 | 6/2010 |
| DE | 10 2009 039 658 | 3/2011 |
| DE | 20 2009 018 416 | 8/2011 |
| DE | 10 2010 041 995 | 4/2012 |
| DE | 10 2012 022 456 | 5/2014 |
| DE | 10 2013 007 562 | 11/2014 |
| DE | 10 2014 210 299 | 12/2015 |
| DE | 10 2014 212 323 | 12/2015 |
| DE | 11 2014 001 418 | 12/2015 |
| DE | 10 2014 224 151 | 6/2016 |
| DE | 10 2015 216 050 | 2/2017 |
| DE | 10 2015 219 263 | 4/2017 |
| DE | 10 2015 222 199 | 5/2017 |
| DE | 20 2015 009 422 | 7/2017 |
| DE | 10 2012 207 042 | 9/2017 |
| DE | 10 2016 013 334 | 4/2018 |
| DE | 10 2017 209 917 | 12/2018 |
| DE | 10 2017 212 193 | 1/2019 |
| DE | 10 2018 207 564 | 11/2019 |
| DE | 10 2018 207 578 | 11/2019 |
| DE | 10 2018 207 585 | 11/2019 |
| DE | 10 2018 207 591 | 11/2019 |
| DE | 10 2018 207 594 | 11/2019 |
| DE | 10 2018 207 611 | 11/2019 |
| DE | 10 2018 207 622 | 11/2019 |
| DE | 10 2018 208 536 | 12/2019 |
| DE | 10 2018 208 540 | 12/2019 |
| DE | 10 2018 208 541 | 12/2019 |
| DE | 10 2018 208 550 | 12/2019 |
| DE | 10 2018 208 945 | 12/2019 |
| DE | 10 2018 210 076 | 12/2019 |
| DE | 10 2018 207 624 | 1/2020 |
| DE | 10 2018 211 327 | 1/2020 |
| DE | 10 2018 211 328 | 1/2020 |
| DE | 10 2018 212 153 | 1/2020 |
| DE | 10 2018 213 350 | 2/2020 |
| DE | 10 2018 220 658 | 6/2020 |
| DE | 10 2020 102 473 | 8/2021 |
| DE | 11 2020 003 063 | 3/2022 |
| DE | 11 2020 004 148 | 6/2022 |
| EP | 0 050 814 | 5/1982 |
| EP | 0 629 412 | 12/1994 |
| EP | 0 764 448 | 3/1997 |
| EP | 0 855 515 | 7/1998 |
| EP | 0 890 179 | 1/1999 |
| EP | 0 916 359 | 5/1999 |
| EP | 1 013 294 | 6/2000 |

(56) References Cited

FOREIGN PATENT DOCUMENTS

| | | |
|---|---|---|
| EP | 1 186 873 | 3/2002 |
| EP | 1 475 880 | 11/2004 |
| EP | 1 169 072 | 5/2005 |
| EP | 1 176 999 | 7/2005 |
| EP | 1 801 420 | 6/2007 |
| EP | 2 009 233 | 12/2008 |
| EP | 2 098 746 | 9/2009 |
| EP | 2 047 872 | 9/2010 |
| EP | 2 403 109 | 1/2012 |
| EP | 2 187 807 | 6/2012 |
| EP | 2 330 724 | 8/2012 |
| EP | 3 326 567 | 10/2014 |
| EP | 1 898 971 | 3/2015 |
| EP | 2 519 273 | 8/2015 |
| EP | 2 217 302 | 9/2015 |
| EP | 2 438 936 | 10/2015 |
| EP | 2 438 937 | 10/2015 |
| EP | 2 960 515 | 12/2015 |
| EP | 2 968 718 | 1/2016 |
| EP | 1 996 252 | 5/2016 |
| EP | 2 475 415 | 6/2016 |
| EP | 2 906 265 | 7/2016 |
| EP | 3 069 739 | 9/2016 |
| EP | 1 931 403 | 1/2017 |
| EP | 3 127 562 | 2/2017 |
| EP | 2 585 129 | 3/2017 |
| EP | 2 646 068 | 3/2017 |
| EP | 3 187 210 | 7/2017 |
| EP | 3 222 301 | 9/2017 |
| EP | 3 222 302 | 9/2017 |
| EP | 3 020 426 | 12/2017 |
| EP | 3 038 669 | 1/2018 |
| EP | 3 062 730 | 1/2018 |
| EP | 3 180 050 | 2/2018 |
| EP | 3 287 154 | 2/2018 |
| EP | 1 789 129 | 6/2018 |
| EP | 2 366 412 | 8/2018 |
| EP | 3 205 359 | 8/2018 |
| EP | 3 205 360 | 8/2018 |
| EP | 3 131 599 | 2/2019 |
| EP | 3 456 367 | 3/2019 |
| EP | 3 119 451 | 6/2019 |
| EP | 3 536 360 | 9/2019 |
| EP | 3 542 835 | 9/2019 |
| EP | 3 542 836 | 9/2019 |
| EP | 3 062 877 | 12/2019 |
| EP | 3 189 862 | 2/2020 |
| EP | 3 668 560 | 6/2020 |
| EP | 3 711 785 | 9/2020 |
| EP | 3 711 786 | 9/2020 |
| EP | 3 711 787 | 9/2020 |
| EP | 3 720 520 | 10/2020 |
| EP | 3 069 738 | 12/2020 |
| EP | 3 069 740 | 12/2020 |
| EP | 3 131 597 | 12/2020 |
| EP | 3 142 722 | 12/2020 |
| EP | 3 579 894 | 12/2020 |
| EP | 3 188 769 | 1/2021 |
| EP | 3 490 122 | 1/2021 |
| EP | 2 869 866 | 2/2021 |
| EP | 3 398 626 | 2/2021 |
| EP | 3 487 549 | 2/2021 |
| EP | 3 113 806 | 3/2021 |
| EP | 3 615 103 | 3/2021 |
| EP | 4 271 461 | 3/2021 |
| EP | 2 344 218 | 4/2021 |
| EP | 3 436 104 | 4/2021 |
| EP | 3 749 383 | 4/2021 |
| EP | 3 808 404 | 4/2021 |
| EP | 3 821 938 | 5/2021 |
| EP | 3 131 615 | 6/2021 |
| EP | 3 338 825 | 6/2021 |
| EP | 3 432 944 | 6/2021 |
| EP | 3 684 439 | 7/2021 |
| EP | 2 582 414 | 8/2021 |
| EP | 3 407 930 | 8/2021 |
| EP | 3 782 665 | 8/2021 |
| EP | 3 782 666 | 8/2021 |
| EP | 3 782 668 | 8/2021 |
| EP | 3 858 397 | 8/2021 |
| EP | 3 216 467 | 9/2021 |
| EP | 3 463 505 | 9/2021 |
| EP | 3 884 968 | 9/2021 |
| EP | 3 884 969 | 9/2021 |
| EP | 3 027 241 | 10/2021 |
| EP | 3 579 904 | 11/2021 |
| EP | 2 628 493 | 12/2021 |
| EP | 3 914 330 | 12/2021 |
| EP | 3 928 825 | 12/2021 |
| EP | 3 556 409 | 1/2022 |
| EP | 3 624 868 | 1/2022 |
| EP | 3 955 985 | 2/2022 |
| EP | 3 624 867 | 3/2022 |
| EP | 3 689 389 | 3/2022 |
| EP | 3 697 464 | 3/2022 |
| EP | 3 737 436 | 3/2022 |
| EP | 3 972 661 | 3/2022 |
| EP | 2 967 630 | 4/2022 |
| EP | 3 142 721 | 4/2022 |
| EP | 3 520 834 | 4/2022 |
| EP | 3 586 887 | 4/2022 |
| EP | 3 638 336 | 4/2022 |
| EP | 3 689 388 | 4/2022 |
| EP | 3 765 110 | 4/2022 |
| EP | 3 782 667 | 4/2022 |
| EP | 3 829 673 | 4/2022 |
| EP | 3 976 129 | 4/2022 |
| EP | 3 984 589 | 4/2022 |
| EP | 3 986 528 | 4/2022 |
| EP | 3 649 926 | 5/2022 |
| EP | 3 653 113 | 5/2022 |
| EP | 3 654 006 | 5/2022 |
| EP | 3 735 280 | 5/2022 |
| EP | 3 897 814 | 5/2022 |
| EP | 3 219 339 | 6/2022 |
| EP | 3 737 310 | 7/2022 |
| EP | 3 899 994 | 8/2022 |
| EP | 4 039 320 | 8/2022 |
| EP | 3 487 550 | 9/2022 |
| EP | 3 606 575 | 9/2022 |
| EP | 3 834 876 | 9/2022 |
| EP | 3 000 492 | 10/2022 |
| EP | 3 600 477 | 10/2022 |
| EP | 3 897 768 | 10/2022 |
| EP | 3 914 310 | 10/2022 |
| EP | 3 914 311 | 10/2022 |
| EP | 3 000 493 | 11/2022 |
| EP | 3 858 422 | 11/2022 |
| EP | 3 866 876 | 11/2022 |
| EP | 3 941 546 | 11/2022 |
| EP | 2 892 583 | 1/2023 |
| EP | 3 393 542 | 1/2023 |
| EP | 3 597 231 | 1/2023 |
| EP | 3 656 292 | 1/2023 |
| EP | 3 768 345 | 1/2023 |
| EP | 2 868 332 | 2/2023 |
| EP | 3 003 420 | 2/2023 |
| EP | 3 539 585 | 2/2023 |
| EP | 3 956 010 | 2/2023 |
| EP | 4 137 193 | 2/2023 |
| EP | 3 046 594 | 3/2023 |
| EP | 3 127 563 | 3/2023 |
| EP | 3 256 186 | 3/2023 |
| EP | 3 288 609 | 3/2023 |
| EP | 3 538 173 | 3/2023 |
| EP | 3 606 576 | 3/2023 |
| EP | 3 927 390 | 3/2023 |
| EP | 3 384 940 | 4/2023 |
| EP | 3 441 616 | 4/2023 |
| EP | 3 938 005 | 4/2023 |
| EP | 3 946 511 | 4/2023 |
| EP | 3 544 649 | 6/2023 |
| EP | 3 634 528 | 6/2023 |
| EP | 3 809 959 | 7/2023 |

(56) References Cited

FOREIGN PATENT DOCUMENTS

| | | |
|---|---|---|
| EP | 3 912 673 | 7/2023 |
| EP | 4 218 897 | 8/2023 |
| EP | 4 218 898 | 8/2023 |
| EP | 4 218 899 | 8/2023 |
| EP | 2 961 984 | 9/2023 |
| EP | 3 352 808 | 9/2023 |
| EP | 3 554 576 | 10/2023 |
| EP | 3 615 102 | 10/2023 |
| EP | 3 737 435 | 10/2023 |
| EP | 3 795 208 | 10/2023 |
| EP | 4 052 754 | 10/2023 |
| EP | 4 149 606 | 10/2023 |
| EP | 3 157 596 | 11/2023 |
| EP | 3 515 525 | 11/2023 |
| EP | 3 621 669 | 11/2023 |
| EP | 3 744 362 | 11/2023 |
| EP | 3 766 428 | 11/2023 |
| EP | 3 808 390 | 11/2023 |
| EP | 4 061 470 | 11/2023 |
| EP | 3 449 958 | 12/2023 |
| EP | 3 687 596 | 12/2023 |
| EP | 3 710 076 | 12/2023 |
| EP | 3 768 340 | 12/2023 |
| EP | 3 787 707 | 12/2023 |
| EP | 3 926 194 | 12/2023 |
| EP | 3 784 305 | 1/2024 |
| EP | 3 801 675 | 1/2024 |
| EP | 3 925 659 | 1/2024 |
| EP | 4 115 919 | 1/2024 |
| EP | 3 634 526 | 2/2024 |
| EP | 3 768 342 | 2/2024 |
| EP | 3 768 347 | 2/2024 |
| EP | 3 769 799 | 2/2024 |
| EP | 3 790 606 | 2/2024 |
| EP | 3 930 780 | 2/2024 |
| EP | 3 782 695 | 3/2024 |
| EP | 3 854 448 | 3/2024 |
| EP | 4 140 532 | 5/2024 |
| EP | 3 693 038 | 6/2024 |
| EP | 3 768 344 | 7/2024 |
| EP | 3 970 765 | 7/2024 |
| EP | 3 854 444 | 9/2024 |
| EP | 4 429 750 | 9/2024 |
| EP | 3 534 985 | 10/2024 |
| EP | 3 793 674 | 10/2024 |
| EP | 3 893 957 | 10/2024 |
| EP | 3 914 334 | 10/2024 |
| EP | 3 618 885 | 11/2024 |
| EP | 4 034 221 | 11/2024 |
| EP | 4 087 641 | 11/2024 |
| EP | 4 039 289 | 12/2024 |
| EP | 4 084 856 | 1/2025 |
| EP | 3 522 947 | 2/2025 |
| EP | 4 429 754 | 2/2025 |
| EP | 3 998 102 | 3/2025 |
| EP | 4 429 751 | 3/2025 |
| EP | 4 429 752 | 3/2025 |
| EP | 4 429 753 | 3/2025 |
| EP | 4 023 282 | 4/2025 |
| EP | 3 950 043 | 5/2025 |
| EP | 3 955 986 | 5/2025 |
| EP | 3 958 921 | 5/2025 |
| EP | 3 990 047 | 5/2025 |
| EP | 4 218 900 | 5/2025 |
| EP | 4 429 755 | 5/2025 |
| EP | 2 830 675 | 6/2025 |
| EP | 3 965 845 | 6/2025 |
| EP | 4 039 319 | 6/2025 |
| EP | 3 668 558 | 7/2025 |
| EP | 3 780 041 | 7/2025 |
| EP | 4 095 872 | 7/2025 |
| EP | 3 848 088 | 8/2025 |
| FR | 1458525 | 3/1966 |
| FR | 2 768 056 | 3/1999 |
| GB | 0 648 739 | 1/1951 |
| GB | 2 213 541 | 8/1989 |
| GB | 2 345 387 | 7/2000 |
| GB | 2 451 161 | 12/2011 |
| GB | 2 545 062 | 6/2017 |
| GB | 2 545 750 | 6/2017 |
| JP | 59-119788 | 8/1984 |
| JP | S61-500059 | 1/1986 |
| JP | S62-113555 | 7/1987 |
| JP | S64-68236 | 3/1989 |
| JP | H02-055886 | 2/1990 |
| JP | 2-79738 | 3/1990 |
| JP | H04-176471 | 6/1992 |
| JP | H04-108384 | 9/1992 |
| JP | H08-057042 | 3/1996 |
| JP | H10-052489 | 2/1998 |
| JP | 2888609 | 5/1999 |
| JP | 2889384 | 5/1999 |
| JP | H11-239617 | 9/1999 |
| JP | 2001-037728 | 2/2001 |
| JP | 2001-515374 | 9/2001 |
| JP | 2001-515375 | 9/2001 |
| JP | 2003-019197 | 1/2003 |
| JP | 2003-525438 | 8/2003 |
| JP | 2003-528697 | 9/2003 |
| JP | 2004-019468 | 1/2004 |
| JP | 2004-278375 | 10/2004 |
| JP | 2005-028137 | 2/2005 |
| JP | 2005-507039 | 3/2005 |
| JP | 2008-511414 | 4/2008 |
| JP | 2008-516654 | 5/2008 |
| JP | 2010-518907 | 6/2010 |
| JP | 2010-258181 | 11/2010 |
| JP | 2010-534080 | 11/2010 |
| JP | 2013-013216 | 1/2013 |
| JP | 2013-519497 | 5/2013 |
| JP | 2014-004303 | 1/2014 |
| JP | 2014-524274 | 9/2014 |
| JP | 2015-514529 | 5/2015 |
| JP | 2015-514531 | 5/2015 |
| JP | 2015-122448 | 7/2015 |
| JP | 2016-002466 | 1/2016 |
| JP | 2016-532500 | 10/2016 |
| JP | 6063151 | 1/2017 |
| JP | 6267625 | 1/2018 |
| JP | 2018-057878 | 4/2018 |
| JP | 2019-516458 | 6/2019 |
| JP | 6572056 | 9/2019 |
| JP | 2020-072985 | 5/2020 |
| JP | 2020-523090 | 8/2020 |
| JP | 2018-510708 | 3/2021 |
| KR | 10-2011-0098192 | 9/2011 |
| RO | 131676 | 2/2017 |
| RU | 2 051 695 | 1/1996 |
| TW | 374317 | 11/1999 |
| UA | 97202 C2 | 1/2012 |
| WO | WO 94/009835 | 5/1994 |
| WO | WO 97/037696 | 10/1997 |
| WO | WO 97/039785 | 10/1997 |
| WO | WO 99/049912 | 10/1999 |
| WO | WO 00/033446 | 6/2000 |
| WO | WO 02/022200 | 3/2002 |
| WO | WO 02/041935 | 5/2002 |
| WO | WO 02/070039 | 9/2002 |
| WO | WO 03/075981 | 9/2003 |
| WO | WO 03/103745 | 12/2003 |
| WO | WO 2005/020848 | 3/2005 |
| WO | WO 2005/028014 | 3/2005 |
| WO | WO 2005/037345 | 4/2005 |
| WO | WO 2007/033933 | 3/2007 |
| WO | WO 2007/105842 | 9/2007 |
| WO | WO 2008/017289 | 2/2008 |
| WO | WO 2008/081783 | 7/2008 |
| WO | WO 2009/010888 | 1/2009 |
| WO | WO 2009/046789 | 4/2009 |
| WO | WO 2009/046790 | 4/2009 |
| WO | WO 2009/073037 | 6/2009 |
| WO | WO 2010/119267 | 10/2010 |
| WO | WO 2011/003043 | 1/2011 |
| WO | WO 2011/081626 | 7/2011 |

(56) References Cited

FOREIGN PATENT DOCUMENTS

| | | |
|---|---|---|
| WO | WO 2011/160858 | 12/2011 |
| WO | WO 2012/018917 | 2/2012 |
| WO | WO 2012/047540 | 4/2012 |
| WO | WO 2012/112129 | 8/2012 |
| WO | WO 2013/037380 | 3/2013 |
| WO | WO 2013/120957 | 8/2013 |
| WO | WO 2013/167432 | 11/2013 |
| WO | WO 2013/173239 | 11/2013 |
| WO | WO 2014/042925 | 3/2014 |
| WO | WO 2015/039605 | 3/2015 |
| WO | WO 2015/063281 | 5/2015 |
| WO | WO 2015/085076 | 6/2015 |
| WO | WO 2015/109028 | 7/2015 |
| WO | WO 2015/172173 | 11/2015 |
| WO | WO 2015/175718 | 11/2015 |
| WO | WO 2016/028644 | 2/2016 |
| WO | WO 2016/137743 | 9/2016 |
| WO | WO 2016/146661 | 9/2016 |
| WO | WO 2016/146663 | 9/2016 |
| WO | WO 2017/004175 | 1/2017 |
| WO | WO 2017/015764 | 2/2017 |
| WO | WO 2017/021465 | 2/2017 |
| WO | WO 2017/053988 | 3/2017 |
| WO | WO 2017/060257 | 4/2017 |
| WO | WO 2017/112695 | 6/2017 |
| WO | WO 2017/112698 | 6/2017 |
| WO | WO 2017/147291 | 8/2017 |
| WO | WO 2017/159849 | 9/2017 |
| WO | WO 2017/162619 | 9/2017 |
| WO | WO 2017/205909 | 12/2017 |
| WO | WO 2018/007120 | 1/2018 |
| WO | WO 2018/036927 | 3/2018 |
| WO | WO 2018/039479 | 3/2018 |
| WO | WO 2018/088939 | 3/2018 |
| WO | WO 2018/081040 | 5/2018 |
| WO | WO 2018/089970 | 5/2018 |
| WO | WO 2018/109038 | 6/2018 |
| WO | WO 2018/139508 | 8/2018 |
| WO | WO 2018/197306 | 11/2018 |
| WO | WO 2019/034670 | 2/2019 |
| WO | WO 2019/035804 | 2/2019 |
| WO | WO 2019/038343 | 2/2019 |
| WO | WO 2019/057636 | 3/2019 |
| WO | WO 2019/067233 | 4/2019 |
| WO | WO 2019/078723 | 4/2019 |
| WO | WO 2019/135767 | 7/2019 |
| WO | WO 2019/137911 | 7/2019 |
| WO | WO 2019/138350 | 7/2019 |
| WO | WO 2019/145253 | 8/2019 |
| WO | WO 2019/158996 | 8/2019 |
| WO | WO 2019/161245 | 8/2019 |
| WO | WO 2019/180104 | 9/2019 |
| WO | WO 2019/180179 | 9/2019 |
| WO | WO 2019/180181 | 9/2019 |
| WO | WO 2019/191245 | 10/2019 |
| WO | WO 2018/135477 | 11/2019 |
| WO | WO 2018/135478 | 11/2019 |
| WO | WO 2019/211410 | 11/2019 |
| WO | WO 2019/219868 | 11/2019 |
| WO | WO 2019/219871 | 11/2019 |
| WO | WO 2019/219872 | 11/2019 |
| WO | WO 2019/219874 | 11/2019 |
| WO | WO 2019/219876 | 11/2019 |
| WO | WO 2019/219881 | 11/2019 |
| WO | WO 2019/219882 | 11/2019 |
| WO | WO 2019/219883 | 11/2019 |
| WO | WO 2019/219884 | 11/2019 |
| WO | WO 2019/219885 | 11/2019 |
| WO | WO 2019/229210 | 12/2019 |
| WO | WO 2019/229211 | 12/2019 |
| WO | WO 2019/229214 | 12/2019 |
| WO | WO 2019/229220 | 12/2019 |
| WO | WO 2019/229221 | 12/2019 |
| WO | WO 2019/229222 | 12/2019 |
| WO | WO 2019/229223 | 12/2019 |
| WO | WO 2019/234146 | 12/2019 |
| WO | WO 2019/239259 | 12/2019 |
| WO | WO 2019/241556 | 12/2019 |
| WO | WO 2019/243582 | 12/2019 |
| WO | WO 2019/243588 | 12/2019 |
| WO | WO 2020/003110 | 1/2020 |
| WO | WO 2020/011760 | 1/2020 |
| WO | WO 2020/011795 | 1/2020 |
| WO | WO 2020/011797 | 1/2020 |
| WO | WO 2020/016438 | 1/2020 |
| WO | WO 2020/028312 | 2/2020 |
| WO | WO 2020/028537 | 2/2020 |
| WO | WO 2020/030700 | 2/2020 |
| WO | WO 2020/064911 | 4/2020 |
| WO | WO 2020/073047 | 4/2020 |
| WO | WO 2020/132211 | 6/2020 |
| WO | WO 2020/176236 | 9/2020 |
| WO | WO 2020/187797 | 9/2020 |
| WO | WO 2020/219430 | 10/2020 |
| WO | WO 2020/234785 | 11/2020 |
| WO | WO 2020/242881 | 12/2020 |
| WO | WO 2020/264174 | 12/2020 |
| WO | WO 2021/046275 | 3/2021 |
| WO | WO 2021/062265 | 4/2021 |
| WO | WO 2021/067691 | 4/2021 |
| WO | WO 2021/119478 | 6/2021 |
| WO | WO 2021/150777 | 7/2021 |
| WO | WO 2021/152013 | 8/2021 |
| WO | WO 2021/191106 | 9/2021 |
| WO | WO 2023/040546 | 12/2021 |
| WO | WO 2022/056542 | 3/2022 |
| WO | WO 2022/063650 | 3/2022 |
| WO | WO 2022/072944 | 4/2022 |
| WO | WO 2022/076862 | 4/2022 |
| WO | WO 2022/076948 | 4/2022 |
| WO | WO 2022/109589 | 5/2022 |
| WO | WO 2022/109590 | 5/2022 |
| WO | WO 2022/109591 | 5/2022 |
| WO | WO 2022/173970 | 8/2022 |
| WO | WO 2022/173977 | 8/2022 |
| WO | WO 2022/174249 | 8/2022 |
| WO | WO 2023/226779 | 9/2022 |
| WO | WO 2023/278599 | 1/2023 |
| WO | WO 2023/014742 | 2/2023 |
| WO | WO 2023/049813 | 3/2023 |
| WO | WO 2024/160098 | 4/2023 |
| WO | WO 2023/076461 | 5/2023 |
| WO | WO 2023/076869 | 5/2023 |
| WO | WO 2023/230157 | 11/2023 |
| WO | WO 2024/104184 | 5/2024 |
| WO | WO 2024/243154 | 11/2024 |

OTHER PUBLICATIONS

International Search Report and Written Opinion received in PCT Application No. PCT/US2021/071419, dated Dec. 1, 2021 in 13 pages.
International Preliminary Report on Patentability and Written Opinion received in PCT Application No. PCT/US2021/071419, dated Mar. 23, 2023 in 7 pages.
Vollkron et al., "Advanced Suction Detection for an Axial Flow Pump", Artificial Organs, 2006, vol. 30, No. 9, pp. 665-670.
Vollkron et al., "Development of a Suction Detection System for Axial Blood Pumps", Artificial Organs, 2004, vol. 28, No. 8, pp. 709-716.
Delgado et al., "Interventional Treatment of Advanced Ischemic Heart Disease", Percutaneous Mechanical Assist Devices, Ch. 6, Springer, 2009, pp. 85-91.
Delgado et al., "Interventional Treatment of Advanced Ischemic Heart Disease", The Future of Treatment of Advanced Ischemic Heart Disease, Ch. 8, Springer, 2009, pp. 129-142.
"FDA Approves Abiomed's Heart Pump Impella, Shares Rise", Reuters 2008 press release, Jun. 2, 2008, https://jp.reuters.com/article/us-abiomed/fda-approves-abiomeds-heart-pump-impella-shares-rise-idUSBNG131420080602/, 1 page.
Lake et al., "Pediatric Cardiac Anesthesia", 4th Edition, 2005, Ch. 15, pp. 291-303.

(56) References Cited

OTHER PUBLICATIONS

Machiraju, Venkat R., "Redo Cardiac Surgery in Adults", Practical Approaches to the Current "On-Pump" Redo Coronary Artery Bypass Surgery, Ch. 2, Springer, 2012, pp. 7-19.
Machiraju, Venkat R., "Redo Cardiac Surgery in Adults", Options for Advanced Mechanical Support for Cardiogenic Shock Complicating Cardiac Reoperations, Ch. 9, Springer, 2012, pp. 67-80.
Machiraju, Venkat R., "Redo Cardiac Surgery in Adults", Percutaneous Approaches to Valvular Heart Disease After Previous Cardiac Surgery, Ch. 21, Springer, 2012, pp. 195-200.
Parrillo et al., "Critical Care Medicine", Principles of Diagnosis and Management in the Adult, Elsevier, 4th Edition, 2014, Chapters 4 & 29, pp. 47-58.e1 and 442-469.e4.
Vincent, MD, PhD, et al., "Textbook of Critical Care", Mechanical Support in Cardiogenic Shock, Elsevier, 7th Edition, Ch. 91, 2017, pp. 637-648.e3.
Ai, X. (2013). Radial Bearings. In: Wang, Q.J., Chung, YW. (eds) Encyclopedia of Tribology. Springer, Boston, MA https://doi.org/10.1007/978-0-387-92897-5_334, accessed Oct. 18, 2024, pp. 4.
"Edwards Sapien 3 Kit—Transapical and Transaortic", Edwards Lifesciences, Released Nov. 8, 2016, pp. 11. chrome-extension://efaidnbmnnnibpcajpcglclefindmkaj/https://edwardsprod.blob.core.windows.net/media/De/sapien3/doc-0045537b%20-%20certitude.pdf.
Eeckhout, MD, PhD, et al., "Handbook of Complications During Percutaneous Cardiovascular Interventions", 2007 Informa UK Ltd., Ch. 12, pp. 167-177.
Escudeiro et al., "Tribological behavior of uncoated and DLC-coated CoCr and Ti-alloys in contact with UHMWPE and PEEK counterbodies;" Tribology International, vol. 89, 2015, pp. 97-104.
GGB by Timken Bearings FAQ; "What is a Slide Bearing?; " https://www.ggbearings.com/en/why-choose-ggb/faq/bearings-faq/what-slide-bearing; accessed Oct. 10, 2024, pp. 1.
Google.com, "Spider Bearing—Search Results;" https://www.google.com/search?q=spider+bearing&rlz=X1C1GCEA_enUS1059US1059&oq=spider+beari&gs_lcrp=EgZjaHJvbWUqCQgAEEUYOxiABDIJCAAQRRg7GIAEMgYIARBFGDkyBwgCEAAYgAQyBwgDEAAYgAQyBwgEEAAYgAQyBwgFEAAYgAQyBwgGEAAYgAQyBggHEEUYPKgCALACAA&sourceid=chrome&ie=UTF-8, accessed Oct. 18, 2024, pp. 4.
Gopinath, Divya, "A System for Impedance Characterization of Coronary Stents", University of Strathclyde Engineering, Thesis, Aug. 2015, pp. 77.
Hinkel et al., "Pump Reliability and Efficiency Increase Maintenance Program—Utilizing High Performance Thermoplastics;" Proceedings of the 16th International Pump Users Symposium, Texas A&M University. Turbomachinery Laboratories; 1999, pp. 115-120.
McMaster-Carr Online Catalog, "Bearings search results;" https://www.mcmaster.com/products/bearings/; accessed Oct. 18, 2024, pp. 5.
McMaster-Carr Online Catalog, "Slide Bearings search results;" https://www.mcmaster.com/products/slide-bearings/; accessed Oct. 18, 2024, p. 21.
Neale, Michael J., "The Tribology Handbook;" 1999, Butterworth-Heinemann, Second Edition, pp. 582.
Park et al., "A Novel Electrical Potential Sensing Method for in Vitro Stent Fracture Monitoring and Detection", Jan. 1, 2011, vol. 21, No. 4, pp. 213-222.
RBCbearings.com, "RBC Bearings Incorporated—Products;" https://www.rbcbearings.com/Products; accessed Oct. 18, 2024, pp. 2.
Sak et al., "Influence of polyetheretherketone coatings on the Ti—13Nb—13Zr titanium alloy's bio-tribological properties and corrosion resistance;" Materials Science and Engineering: C, vol. 63, 2016, pp. 52-61.
SKF.com; "Products: Bearings;" https://www.skf.com/us/products/bearings; accessed Oct. 18, 2024, pp. 8.
Vincent, MD, Phd, et al., "Textbook of Critical Care", Elsevier, 7th Edition, Ch. 78, 2017, pp. 520-531.e3.
Wikipedia, "Plain Bearing," https://en.wikipedia.org/wiki/Plain_bearing; accessed Oct. 18, 2024, pp. 10.

\* cited by examiner

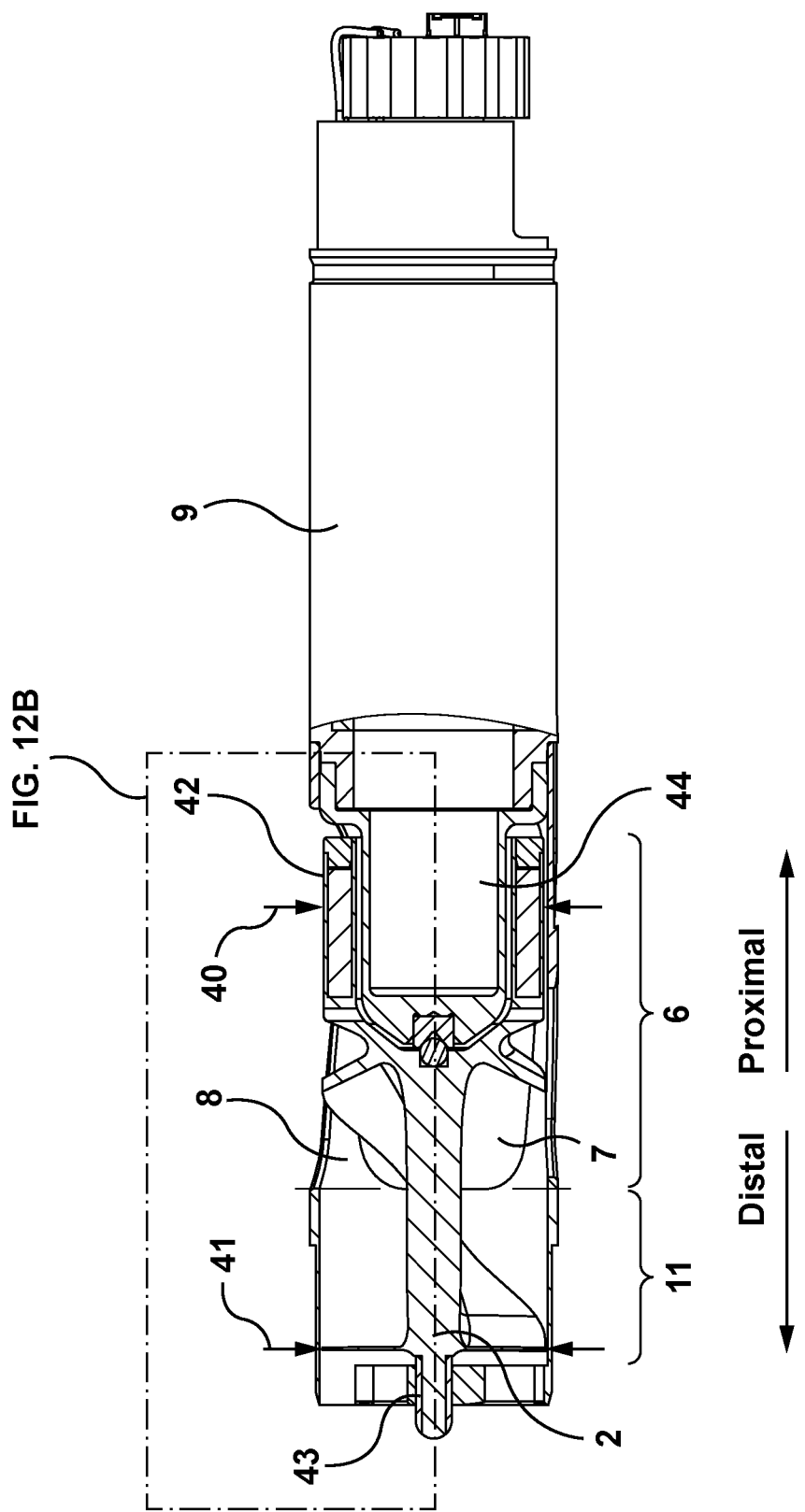

CARDIOVASCULAR SUPPORT PUMP HAVING AN IMPELLER WITH A VARIABLE FLOW AREA

CROSS-REFERENCE TO RELATED APPLICATIONS

This application is a U.S. National Phase Application of International Patent Application No. PCT/US2021/071419, filed Sep. 10, 2021, which claims the priority benefit of U.S. Provisional Patent Application No. 63/078,207, filed Sep. 14, 2020, the entire disclosure of each of which is hereby incorporated by reference herein in its entirety.

BACKGROUND

Technical Field

The present disclosure is directed generally to mechanical cardiovascular support systems used in the medical field to assist the movement of blood. In particular, the present disclosure is directed to mechanical cardiovascular support devices having features that allow improved performance such as optimized flow area between impeller blades or shafts or other components and a surrounding inlet tube, or optimized space between certain stationary and moving parts.

Description of the Related Art

Mechanical circulatory support devices are used to assist a patient's heart with moving blood through the body. They often consist of an electrical motor, a tubular inflow canula with an inflow area at the distal end and an outflow area at the proximal end, and an impeller rotated by the motor that moves blood through the tubular inflow cannula and out through the outflow area. A particular design challenge is to optimize blood flow while minimizing risk of damage to the device or to the blood. A higher blood flow than what is provided by current devices may improve outcomes for mild cardiogenic shock patients or high-risk percutaneous coronary intervention patients. However, increasing flow may also increase risk of hemolysis or device damage.

Thus, there is a need for improved mechanical circulatory support designs that can allow for greater blood flow while avoiding risk of hemolysis or device damage, among other improvements.

SUMMARY

This disclosure is related to mechanical circulatory support systems having an impeller with a variable outer diameter or having a variable radial gap between the impeller blades or other components of and impeller and a tubular cannula containing the impeller. The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for mechanical circulatory support systems.

The following disclosure describes non-limiting examples of some embodiments of mechanical circulatory support devices. For instance, other embodiments of the disclosed systems and methods may or may not include the features described herein. Moreover, disclosed advantages and benefits can apply only to certain embodiments and should not be used to limit the disclosure.

One aspect of the disclosure is a mechanical circulatory support device including: a tubular cannula including an inflow region, an outflow region, and a distal impeller region, and an impeller having a proximal end and a distal end, the impeller being positioned within the tubular cannula at least partly in the outflow region and at least partly in the distal impeller region, wherein a radial gap between the impeller and an inner surface of the tubular cannula varies in size between the proximal end and the distal end, wherein the size of the radial gap at a particular location between the proximal end and the distal end includes a radial distance between a maximum impeller width and the inner surface of the tubular cannula at the particular location.

A $2^{nd}$ aspect of the disclosure relates to the device of aspect 1, wherein the impeller includes a distally tapered section tapering distally from a first diameter to a distal diameter, wherein the distal diameter is less than the first diameter.

A $3^{rd}$ aspect of the disclosure relates to the device of aspect 2, wherein the impeller includes a constant diameter section extending proximally from the distally tapered section, the constant diameter section having the first diameter.

A $4^{th}$ aspect of the disclosure relates to the device of aspect 3, wherein the constant diameter section extends at least partially within the distal impeller region and at least partially into the outflow region.

A $5^{th}$ aspect of the disclosure relates to the device of either aspect 3 or aspect 4, wherein the constant diameter section extends from the distally tapered section to the proximal end of the impeller.

A $6^{th}$ aspect of the disclosure relates to the device of either aspect 3 or aspect 4, wherein the impeller includes a proximal narrowed diameter section proximal to the constant diameter section, the proximal narrowed diameter section having a narrowed diameter less than the first diameter.

A $7^{th}$ aspect of the disclosure relates to the device of aspect 6, wherein the narrowed diameter is smaller than the first diameter by between 0.15 mm and 0.35 mm.

An $8^{th}$ aspect of the disclosure relates to the device of any one of aspects 6 to 7, wherein the radial gap at the proximal narrowed diameter section is about 0.20 mm greater than a minimum radial gap in the distal impeller region.

A $9^{th}$ aspect of the disclosure relates to the device of any one of aspects 6 to 7, wherein the radial gap at the proximal narrowed diameter section is about 0.125 mm greater than a minimum radial gap in the distal impeller region.

A $10^{th}$ aspect of the disclosure relates to the device of any one of aspects 2 to 9, wherein the radial gap is between 0.095 mm and 0.125 mm at a location of the distal diameter.

An $11^{th}$ aspect of the disclosure relates to the device of any one of aspects 2 to 10, wherein the radial gap is between 0.060 mm and 0.090 mm at the location of the first diameter.

A $12^{th}$ aspect of the disclosure relates to the device of any one of aspects 2 to 11, wherein the distal diameter is between 0.40 mm and 0.100 mm less than the first diameter.

A $13^{th}$ aspect of the disclosure relates to the device of any one of aspects 2 to 12, wherein a slope of the tapered section is about 0.0117.

A $14^{th}$ aspect of the disclosure relates to the device of any one of aspects 2 to 13, wherein an inner diameter of the tubular cannula is between 4.39 mm and 4.45 mm.

A 15th aspect of the disclosure relates to the device of any one of aspects 2 to 14, wherein a length of the impeller is between 7.5 mm to 8.5 mm.

A 16th aspect of the disclosure relates to the device of any one of aspects 2 to 15, wherein the proximal end of the impeller is mounted to a drive shaft.

A 17th aspect of the disclosure relates to the device of any one of aspects 2 to 16, wherein the distal end of the impeller is a free end.

An 18th aspect of the disclosure relates to the device of any one of aspects 2 to 17, further including a motor housing, wherein the motor housing is coupled to a proximal end of the inlet cannula.

A 19th aspect of the disclosure relates to the device of aspect 1, further including a driven magnetic rotor, wherein the impeller is coupled to the driven magnetic rotor.

A 20th aspect of the disclosure relates to the device of aspect 19, further including a bearing configured to hold the distal end of the impeller in an axial center of the tubular cannula.

A 21st aspect of the disclosure relates to the device of aspect 20, wherein the bearing includes a plurality of spokes connecting the bearing to the tubular cannula and configured to maintain the position of the bearing with respect to the tubular cannula.

A 22nd aspect of the disclosure relates to the device of any one of aspects 19 to 21, wherein the driven magnetic rotor is positioned at least partially in the outflow region.

A 23rd aspect of the disclosure relates to the device of any one of aspects 19 to 22, wherein the radial gap between the impeller and the inner surface of the tubular cannula is greater in the outflow region than in the distal impeller region.

A 24th aspect of the disclosure relates to the device of any one of aspects 19 to 23, wherein the radial gap between the impeller and the inner surface of the tubular cannula is between 2 and 3 times greater in at least a portion of the outflow region than at the distal impeller region.

A 25th aspect of the disclosure relates to the device of any one of aspects 19 to 22, wherein the impeller includes a constant diameter.

A 26th aspect of the disclosure relates to the device of any one of aspects 19 to 25, wherein the impeller includes a first diameter within the distal impeller region and the driven magnetic rotor includes second diameter within the outflow region smaller than the first diameter.

A 27th aspect of the disclosure relates to the device of aspect 26, wherein the radial gap between the impeller and the inner surface of the tubular cannula at a location of the first diameter is larger than a second radial gap between the driven magnetic rotor and the tubular cannula at a location of the second diameter.

A 28th aspect of the disclosure relates to the device of aspect 27, wherein the radial gap between the impeller and the inner surface of the tubular cannula at the location of the first diameter is between 0.065 mm to 0.150 mm.

A 29th aspect of the disclosure relates to the device of either aspect 27 or 28, wherein the second radial gap is between 2 and 3 times larger than the radial gap between the impeller and the inner surface of the tubular cannula at the location of the first diameter.

A 30th aspect of the disclosure is a mechanical circulatory support device including: a tubular cannula including an inflow region, an outflow region, and a distal impeller region, and an impeller positioned in the tubular cannula partly in the outflow region and partly in the distal impeller region, wherein a first radial gap between the impeller and the distal impeller region is smaller than a second radial gap between the impeller and the outflow region of the tubular cannula.

A 31st aspect of the disclosure relates to the device of aspect 30, wherein the outflow region includes one or more struts.

A 32nd aspect of the disclosure relates to the device of any one of aspects 30 to 31, wherein the impeller has a first diameter in the distal impeller region and a second diameter in the outflow region, wherein the second diameter is smaller than the first diameter.

A 33rd aspect of the disclosure relates to the device of aspect 32, wherein the first diameter is in a range of 3.8 mm to 5.92 mm.

A 34th aspect of the disclosure relates to the device of aspect 32 or aspect 33, wherein the second diameter is in a range of 0.5 mm to 5.92 mm.

A 35th aspect of the disclosure relates to the device of any one of aspects 32 to 34, wherein a transition from the first diameter to the second diameter is a step transition.

A 36th aspect of the disclosure relates to the device of any one of aspects 32 to 34, wherein a transition from the first diameter to the second diameter is a sloped transition.

A 37th aspect of the disclosure relates to the device of any one of aspects 32 to 34, wherein a transition from the first diameter to the second diameter is a curved transition.

A 38th aspect of the disclosure relates to the device of any one of aspects 30 to 31, wherein the impeller has a constant diameter.

A 39th aspect of the disclosure relates to the device of any one of aspects 30 to 31 or 38, further including an insert sleeve positioned in the distal impeller region.

A 40th aspect of the disclosure relates to the device of aspect 39, wherein the insert sleeve includes a chamfered distal end and a chamfered proximal end.

A 41st aspect of the disclosure relates to the device of any one of aspects 39 or 40, wherein the insert sleeve is made from PEEK.

A 42nd aspect of the disclosure relates to the device of any one of aspects 39 to 41, wherein the insert sleeve includes an inner surface with a lubricious coating.

A 43rd aspect of the disclosure relates to the device of any one of aspects 30 to 42, wherein the first radial gap is in a range of 0.04 mm to 0.5 mm.

A 44th aspect of the disclosure relates to the device of any one of aspects 30 to 43, wherein the second radial gap is in a range of 0.04 mm to 3 mm.

A 45th aspect of the disclosure relates to the device of any one of aspects 30 to 44, wherein the impeller is connected to a drive shaft of a motor.

A 46th aspect of the disclosure relates to the device of any one of aspects 30 to 44, wherein the impeller is magnetically coupled to a motor.

A 47th aspect of the disclosure relates to the device of any one of aspects 30 to 46, wherein the impeller includes at least two impeller blades.

A 48th aspect of the disclosure relates to the device of any one of aspects 30 to 47 in combination with aspect 31, wherein the struts have a thickness that is greater than a thickness of the tubular cannula.

A 49th aspect of the disclosure relates to the device of any one of aspects 30 to 37, wherein the impeller includes impeller blades in the distal impeller region, and wherein the device further includes a radially symmetric conical form in the outflow region.

A 50th aspect of the disclosure relates to the device of aspect 49, wherein the radially symmetric conical form has an electropolished surface.

A 51st aspect of the disclosure relates to the device of any one of aspects 49 or 50, wherein the radially symmetric conical form includes a concave surface.

A 52nd aspect of the disclosure relates to the device of any one of aspects 49 to 51, wherein the radially symmetric conical form includes a convex surface.

A 53rd aspect of the disclosure relates to the device of aspect 52 in combination with aspect 51, wherein the convex surface is proximal to the concave surface.

A 54th aspect of the disclosure relates to the device of any one of aspects 49 to 53, wherein the radially symmetric conical form is affixed to or part of an impeller shaft.

A 55th aspect of the disclosure relates to the device of any one of aspects 49 to 53, wherein the radially symmetric conical form is affixed to or part of a motor housing or the tubular cannula.

A 56th aspect of the disclosure relates to the device of aspect 55, wherein an impeller shaft of the impeller passes through a lumen in the conical form.

A 57th aspect of the disclosure relates to the device of aspect 56, wherein a bearing is positioned between the impeller shaft and the conical form.

A 58th aspect of the disclosure relates to the device of aspect 56 or 57, wherein a seal is positioned between the impeller shaft and the conical form.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated and make part of this disclosure.

FIG. 12A is a schematic illustration of an MCS device having a variable radial gap between an impeller and a surrounding cannula or impeller housing and having a driven magnetic rotor.

DETAILED DESCRIPTION

The disclosure herein is related to mechanical circulatory support devices having features that may optimize the ability to move blood while minimizing risk of damage to the device or to the blood. In particular, the disclosure relates to features of an impeller or components intended to rotate and their relationship with a tubular inflow cannula or components intended to remain stationary and their outflow region. The following detailed description is directed to certain specific embodiments. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings.

Figure 1:
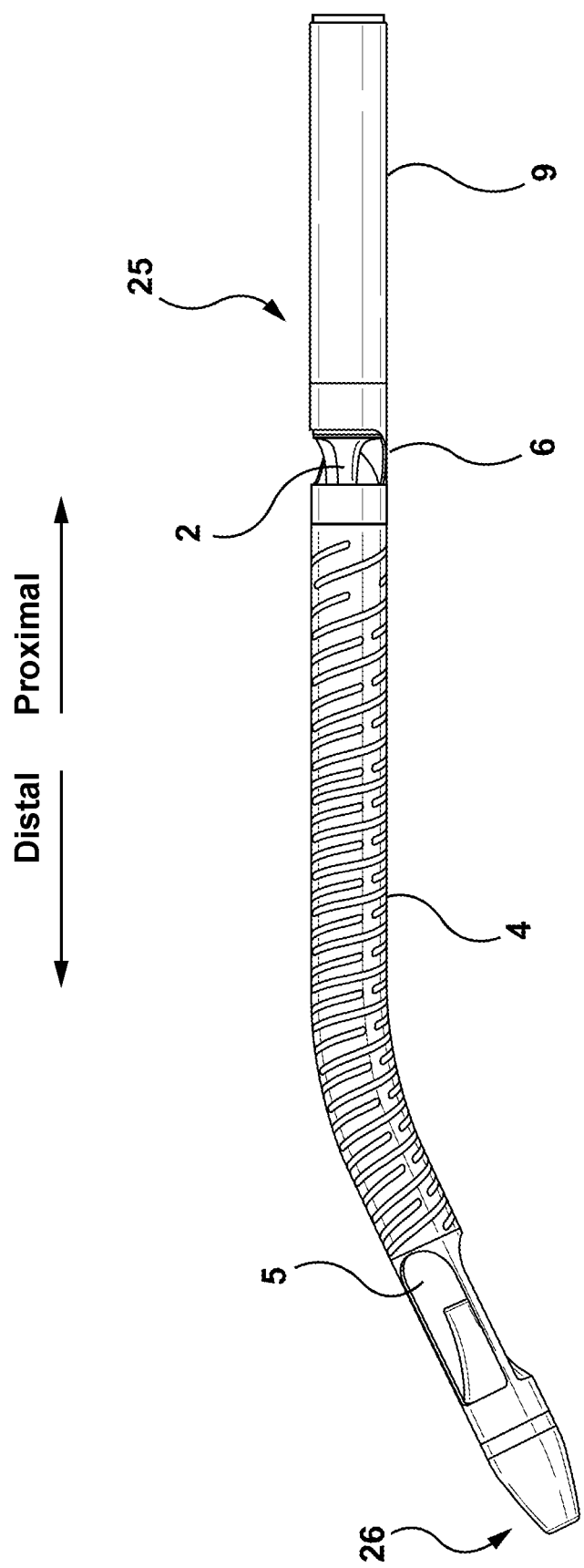
FIG. 1 is a schematic illustration of a mechanical circulatory support (MCS) device.

As shown in FIG. 1, a mechanical circulatory support (MCS) device may include an inlet tube or tubular inflow cannula 4 having a proximal end 25 and a distal end 26, an inflow region 5 at the distal end, an outflow region 6 at the proximal end, and a motor 9 for driving an impeller 2 that is positioned at least partially within the tubular canula. The rotating impeller draws blood into the stationary inflow canula 4 through the inflow region 5 and pushes the blood out of the device at least partially through the outflow region 6.

Figure 2A:
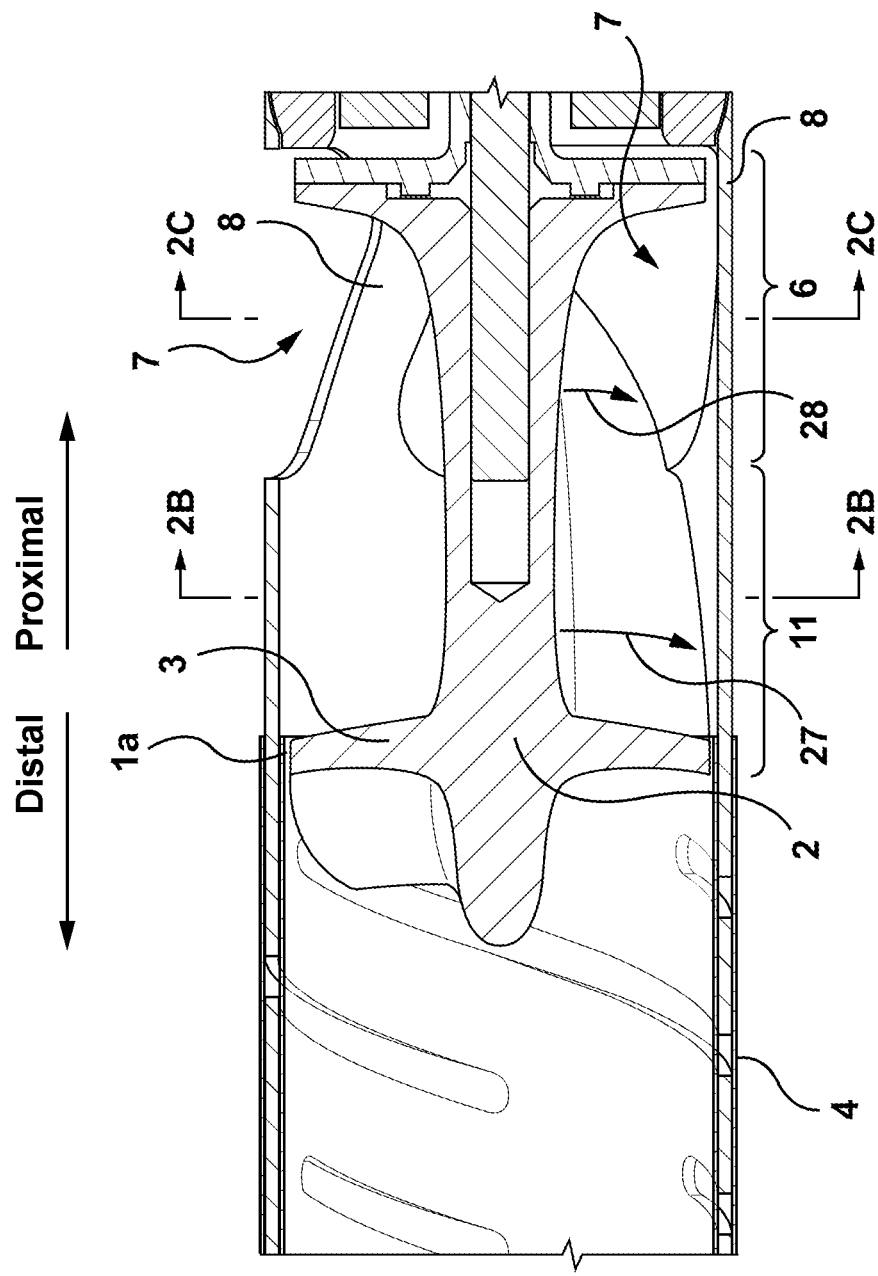
FIG. 2A is a schematic illustration of a cutaway view of a portion of an MCS device.

FIG. 2A is a close-up cut away view of a section of the MCS device of FIG. 1. The outflow region 6 may include struts 8 that connect the tubular inlet canula 4 to the motor housing 9. For example, an MCS device may have at least two struts 8 (e.g., three, four, five struts). The outflow region 6 has openings or windows 7 in the tubular canula defined by the struts 8. The inside or outside edges of the openings or the cut face of the openings 7 may be rounded (e.g., having a diameter of curvature equal to the thickness of the tubular inflow cannula, which may be in a range of 0.10 to 0.15 mm). There is a very small radial gap 1a between the outer edges of the impeller blades 3 and the inner surface of the tubular inflow cannula 4. The rotating edges of the impeller blades 3 should not contact the tubular canula 4 so as to avoid mechanical wear, friction, loss of impeller speed, increase in motor draw, generation of heat or other unwanted effects. However, it can be advantageous to have a minimal radial gap 1a between the impeller blades 3 and the inner surface of the cannula 4 in order to maximize efficiency and reduce hemolysis. Hemolysis is a form of blood damage that can be caused by hydraulic shear stress applied to the blood cells. Hemolysis may be characterized by damaged hemoglobin and a measure of hemolysis may include hemolysis damage potential (HDP), which corresponds to the ratio of the free hemoglobin to the total amount of hemoglobin in a blood sample. The amount of hemolysis may be dependent on several factors, one of which can be impeller speed. Thus, generally speaking, the higher the efficiency, or flow rate generated by a given impeller speed, the higher the flow rate may be while minimizing hemolysis. An effect of minimizing the radial gap 1a may include minimizing reflow, a factor influencing efficiency. Consequently, the smaller the radial gap 1a between the impeller blades and the inner surface of the tubular cannula 4 is, a higher flow rate to hemolysis damage potential may be realized facilitating the production of a sufficient flow rate while causing acceptably low hemolysis. This applies to a distal impeller region 11, a region distal to the outflow region 6 where the impeller blades rotate within a stiff, section of the tubular cannula 4, for example wherein laser cuts are not made to increase stiffness, wherein apart from the minimal radial gap the blood must flow in a space defined by the inner surface of the tubular cannula and the impeller. With a sufficient speed the helical pitch of the rotating impeller blades in the confined space defined by the tubular cannula generates a hydraulic operating point that causes the blood to flow through the distal impeller region 11 toward the outflow region 6. The displacement of blood creates a pressure differential that pulls blood into the inflow region 5 of the tubular cannula 4.

In the outflow region 6, the rotating impeller blades direct blood flow out of the outflow windows 7. In the outflow region 6 where the tubular cannula 4 has outflow openings or windows 7 defined by struts 8, minimizing a radial gap 1b between the impeller blades 3 and the inner surface of struts 8 can contribute less to efficiency compared to the distal impeller region 11 because of flow disturbances which occur as an interaction between blood flow and the struts 8. In some embodiments, minimizing the radial gap 1b in the outflow region 6 may undesirably increase the hemolysis damage potential, in part due to hydraulic shear forces applied to the blood cells in the space 1b between the impeller blades and the struts. Furthermore, minimizing the radial gap 1b may pose challenges of manufacturing very small tolerances that can increase risk of the blades and struts contacting during use, which may lead to material wear, increased motor current, heat production, or other device damage as well as increased hemolysis. Thus, an aspect of this disclosure relates to designs of MCS devices wherein a first radial gap 1a between impeller blades and the inner surface of the tubular cannula in the distal impeller region 11 is minimized (e.g., in a range of 0.04 mm to 0.5 mm), and a second radial gap 1b between impeller blades and the inner surface of the struts 8 is larger (e.g., in a range of 0.04 mm to 3 mm and larger than the first radial gap) than the first radial gap, which may optimize efficiency and reduce the risk of damaging blood or the device itself during use.

Figure 2C:
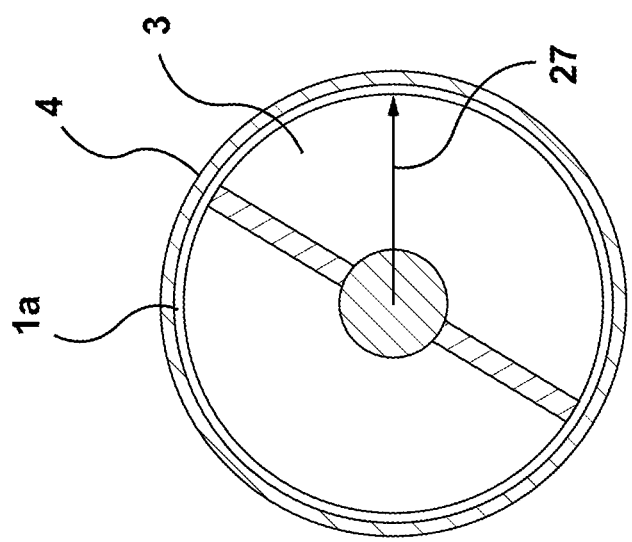
FIG. 2C is a cross section of the outflow region of FIG. 2A.
Figure 2B:
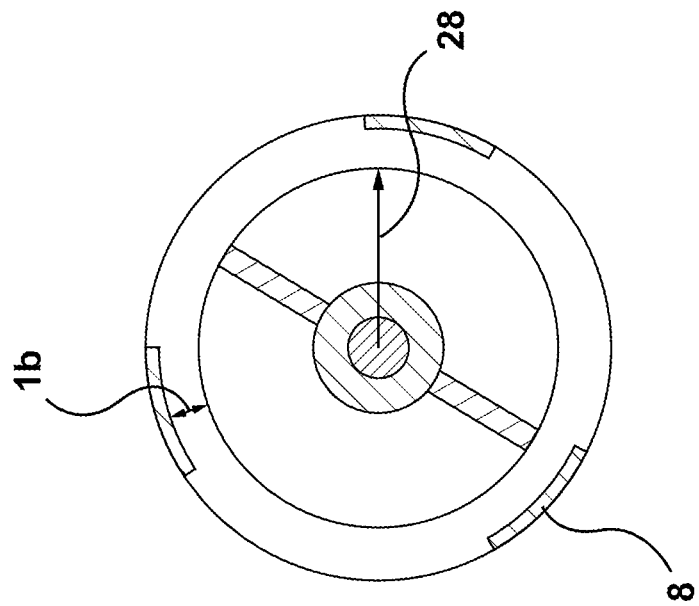
FIG. 2B is a cross section of the distal impeller region of FIG. 2A.

One way to increase the second radial gap 1b is to decrease the diameter of the impeller blades in the outflow region 6 compared to the diameter of the impeller blades in the distal impeller region 11, while maintaining a consistent tubular cannula inner diameter. With this approach the larger the radial gap 1b is, the smaller the diameter of the impeller blades in the outflow region is. FIG. 2A shows an example of an impeller 3 having a first radius 27 in the distal impeller region 11 and a second radius 28 in the outflow region 6. FIG. 2B is a cross sectional view of FIG. 2A at the distal impeller region 11 and FIG. 2C is a cross sectional view of FIG. 2A at the outflow region 6. Impeller radius 27 is larger than impeller radius 28 and consequently radial gap 1a is smaller than radial gap 1b.

Figure 3:
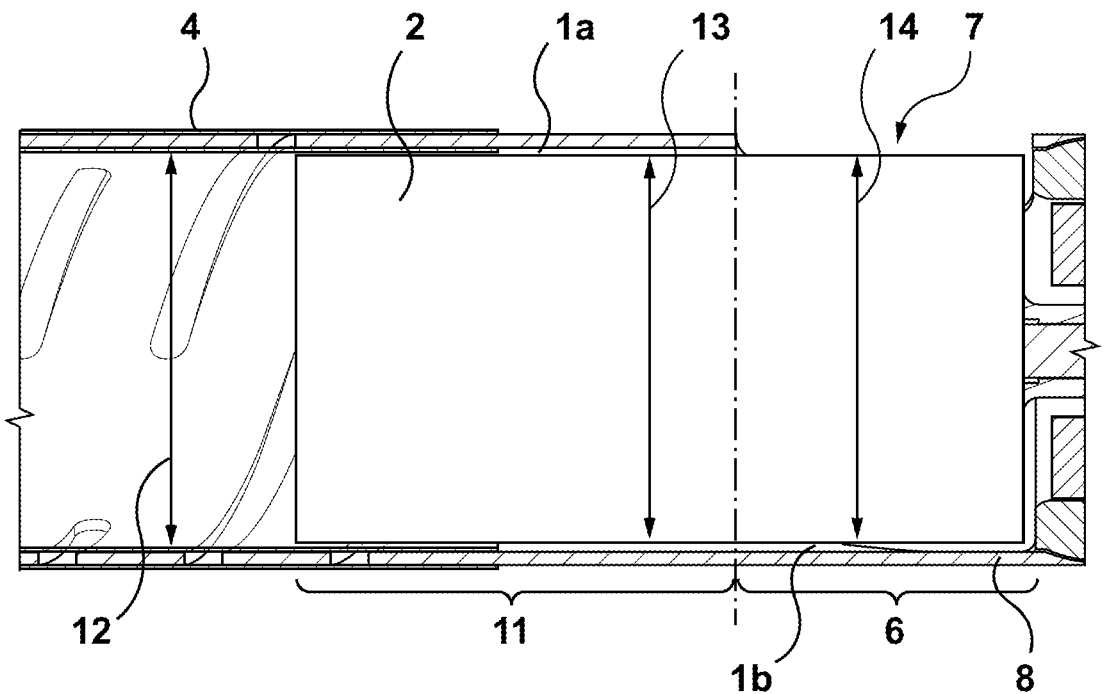
FIG. 3 is a schematic illustration of an MCS device having a consistent radial gap in the distal impeller region and outflow region.

FIG. 3 is a schematic illustration of a cutaway view of a portion of an MCS device, showing an impeller having a consistent impeller diameter, which may be representative of some of the arrangements in current MCS devices. For simplification the impeller 2 is drawn as a cylinder to represent the outer most extent of at least two helically pitched impeller blades and show the diameter 13. The impeller 2 may have more than two impeller blades, preferably balanced radially. The impeller blades may be substantially helical or have a varying pitch or have a plurality of inflections. The tubular cannula 4 may have an inner diameter 12, for example in a range of 3.8 mm to 6 mm (e.g., in a range of 3.8 mm to 5 mm, or in a range of 4.3 mm to 4.5 mm). The impeller has a first diameter 13 in the distal impeller region 11 and a second diameter 14 in the outflow region 6. In FIG. 3 the first diameter 13 and the second diameter 14 are equal resulting in the first gap 1a and the second gap 1b being equal.

Figure 4:
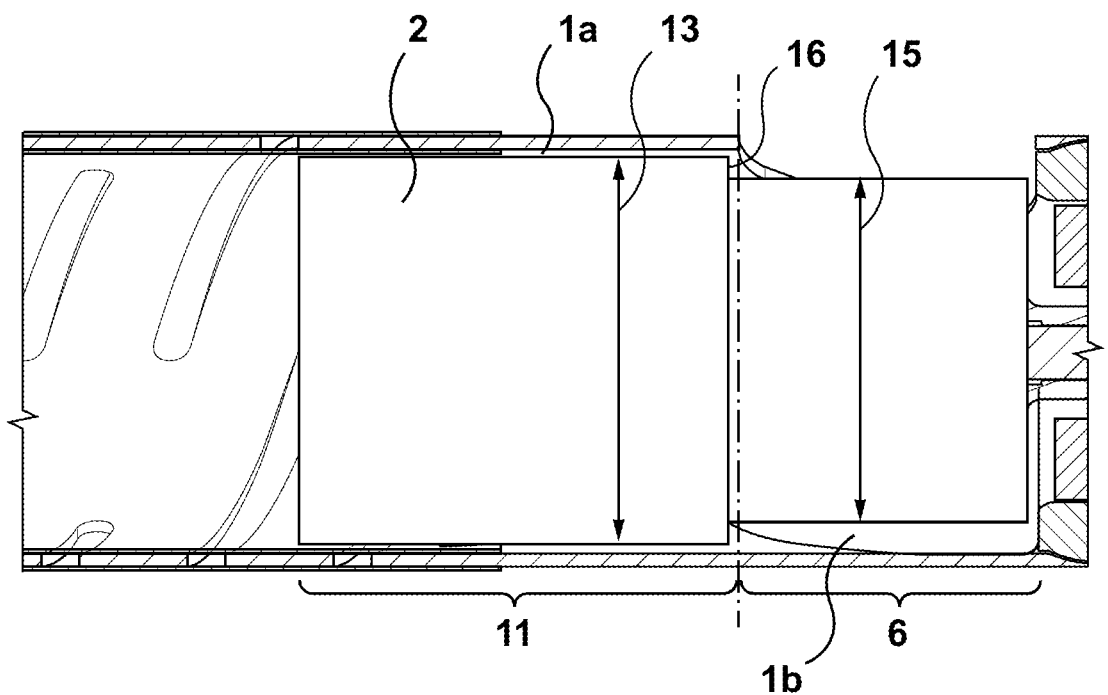
FIG. 4 is a schematic illustration of an MCS device having a minimalized radial gap in the distal impeller region and a larger radial gap in the outflow region.
Figure 5:
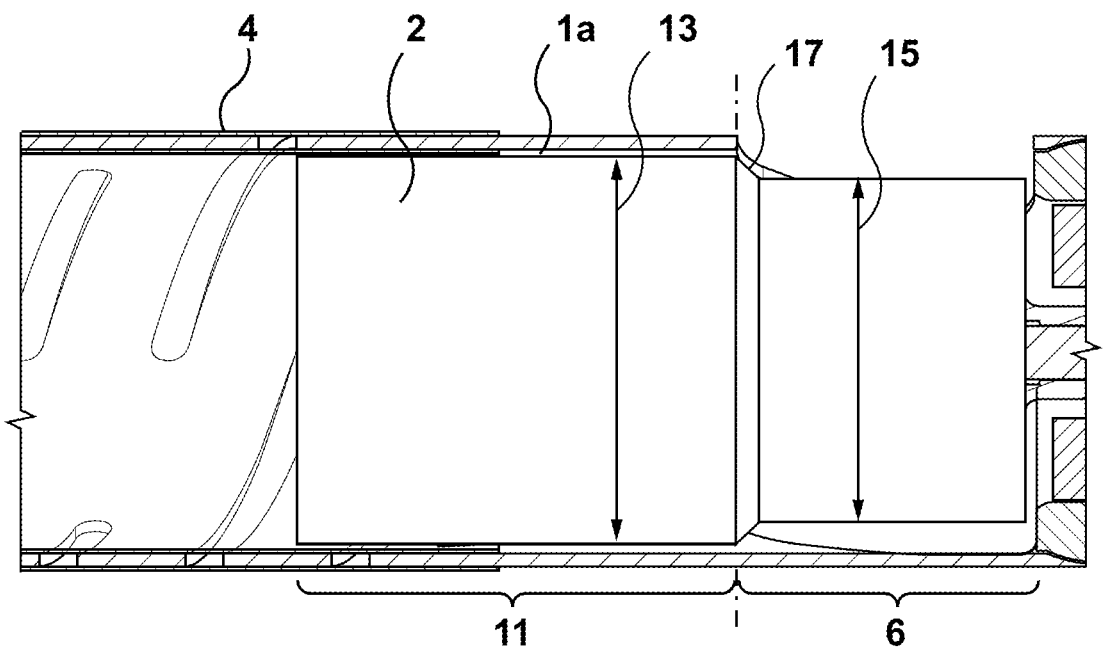
FIG. 5 is a schematic illustration of an MCS device having a minimalized radial gap in the distal impeller region and a larger radial gap in the outflow region with a sloped transition.

In contrast to FIG. 3, FIG. 4 shows an impeller 2, also drawn as a cylinder for simplification, having a first diameter 13 in the distal impeller region 11, and a second diameter 15 in the outflow region 6, wherein the second diameter 15 is less than the first diameter 13. The resulting first gap 1a is minimalized for optimum efficiency, for example in a range of 0.040 mm to 0.200 mm (e.g., in a range of 0.070 to 0.1 mm, about 0.075 mm), and the second gap 1b is larger than the first gap 1a, for example the second gap 1b may be in a range of 1 to 50 times as large as the first gap 1a (e.g., the second gap 1b may be in a range of 0.040 mm to 2 mm, about 0.20 mm). The difference between the first diameter 13 and reduced diameter 15 may be about 0.25 mm. The transition 16 between the first diameter 13 and second diameter 15 may be a step as shown in FIG. 4. Alternatively, the transition may be a gradual slope 17 as shown in FIG. 5. For example, the slopped transition 17 may have a rise vs. run or change in diameter vs. length of slope in a range of 0.011 to 2 (e.g., 1). Furthermore, the transition may be curved or have multiple inflections (e.g., an S-shaped curve).

Figure 6:
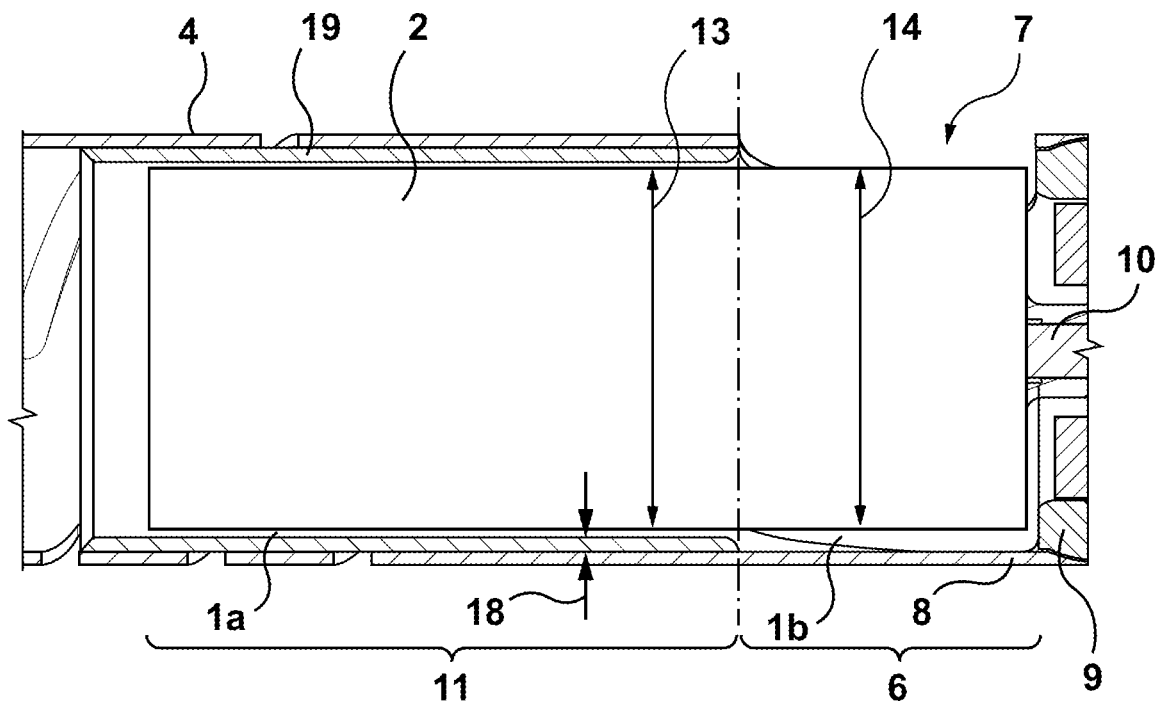
FIG. 6 is a schematic illustration of an MCS device having an impeller with a consistent diameter and an insert sleeve to minimize the radial gap in the distal impeller region.

An alternative embodiment is shown in FIG. 6, which is a schematic illustration of a portion of an MCS device showing a cutaway view of an impeller 2 having a consistent diameter, in other words the first diameter 13 in the distal impeller region 11 is equal to the second diameter 14 in the outflow region 6. The tubular cannula 4 has a consistent outer diameter in the distal impeller region 11 and the outflow region 6. A sleeve 19 is inserted in the tubular cannula at least in the distal impeller region 11 but not in the outflow region 6. The sleeve 19 is intended to remain stationary in use with respect to the inlet tube. The sleeve has an outer diameter that fits snugly in the inner diameter of the tubular cannula, optionally adhered, form fit, or press fit together, and an inner diameter that is slightly larger than the first impeller diameter 13 by a distance equal to the gap 1a. Since the sleeve 19 is not in the outflow region 6, the gap 1b is larger than gap 1a by the thickness 18 of the sleeve 19, which may be in a range of 0.04 to 2 mm, for example. Optionally, the sleeve 19 has a distal end and a proximal end that are tapered or chamfered as shown to improve fluid flow. Optionally, the sleeve 19 may be made of a high-density polymer such as PEEK to resist wear should the impeller contact the sleeve during use. Optionally, the inner surface of the sleeve may have a lubricious coating to further reduce hydraulic sheer stress in the blood.

Figure 7:
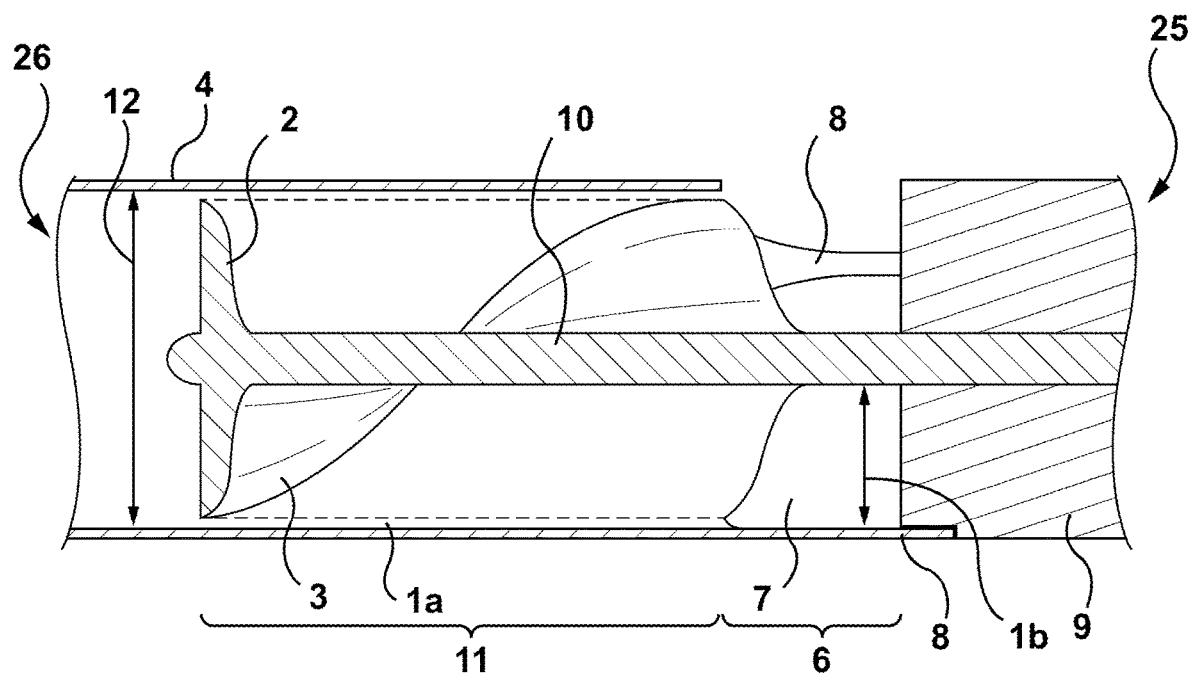
FIG. 7 is a schematic illustration of an MCS device having an impeller with impeller blades in a distal impeller region and no impeller blades in the outflow region.

Another embodiment is shown in FIG. 7, a schematic illustration of a portion of an MCS device showing a cutaway view of an impeller 2 having impeller blades 3 in the distal impeller region 11 and no impeller blades in the outflow region 6. The impeller shaft 10 may be rod-shaped in the distal impeller region 11 from which the impeller blades 3 extend radially and the rod-shaped shaft 10 may pass through the outflow region to connect to the motor driveshaft or a rotor. The first radial gap 1a between impeller blades 3 and the inner surface of the tubular cannula 4 may be in a range of 0.04 mm to 0.5 mm (e.g., 0.1 mm). the second radial gap 1b spans the distance between the shaft 10 and the inner surface of the struts 8 and may be in a range of 1.75 mm to 3 mm.

Figure 8:
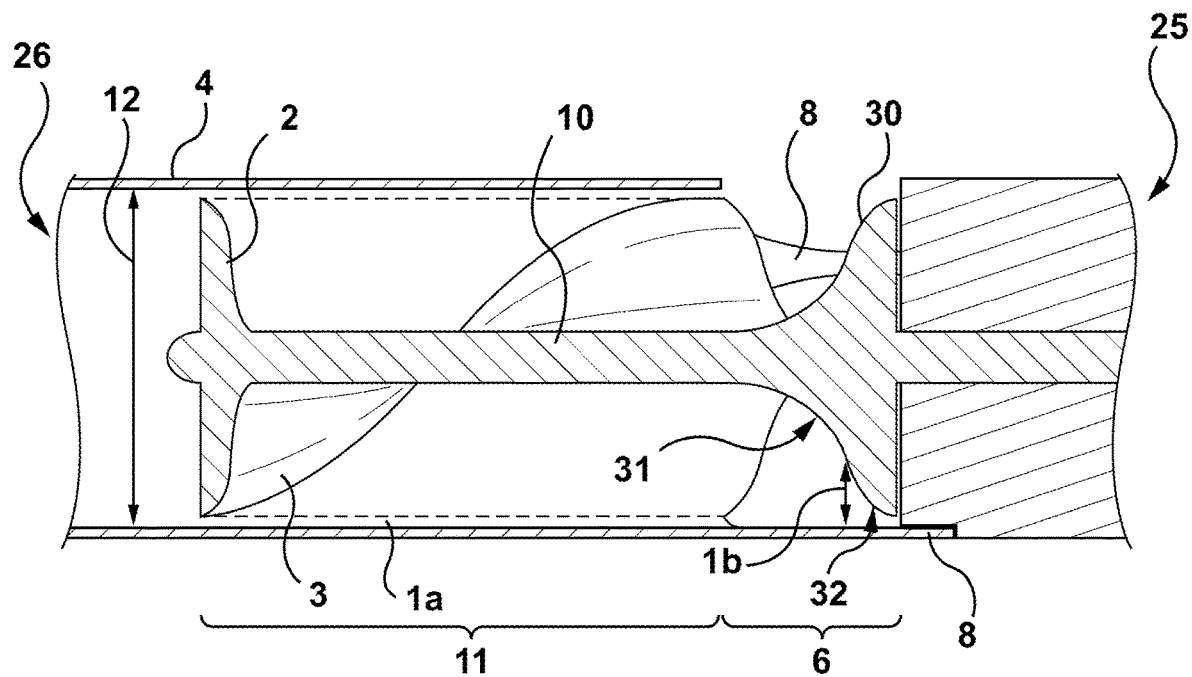
FIG. 8 is a schematic illustration of an MCS device having an impeller with impeller blades in a distal impeller region and a conical form in the outflow region connected to the impeller.

Alternatively, as shown in FIG. 8, the shaft 10 may be rod-shaped in the distal impeller region 11 then have a conical form 30 in the outflow region. Optionally the conical form 30 may have a concave taper 31 that may facilitate directing the blood flow out through the windows 7 in the outflow region 6. Optionally, a proximal portion of the conical part of the shaft 30 has a convex curve 32. The first radial gap 1a between impeller blades 3 and the inner surface of the tubular cannula 4 may be in a range of 0.04 mm to 0.5 mm (e.g., 0.1 mm). The second radial gap 1b is the distance between the conical shaft 30 and the inner surface of the struts 8, wherein the gap 1b at the closest point to the strut 8 may be in a range of 0.04 mm to 2 mm. Optionally, the conical form 30 may have an electropolished surface.

Figure 9:
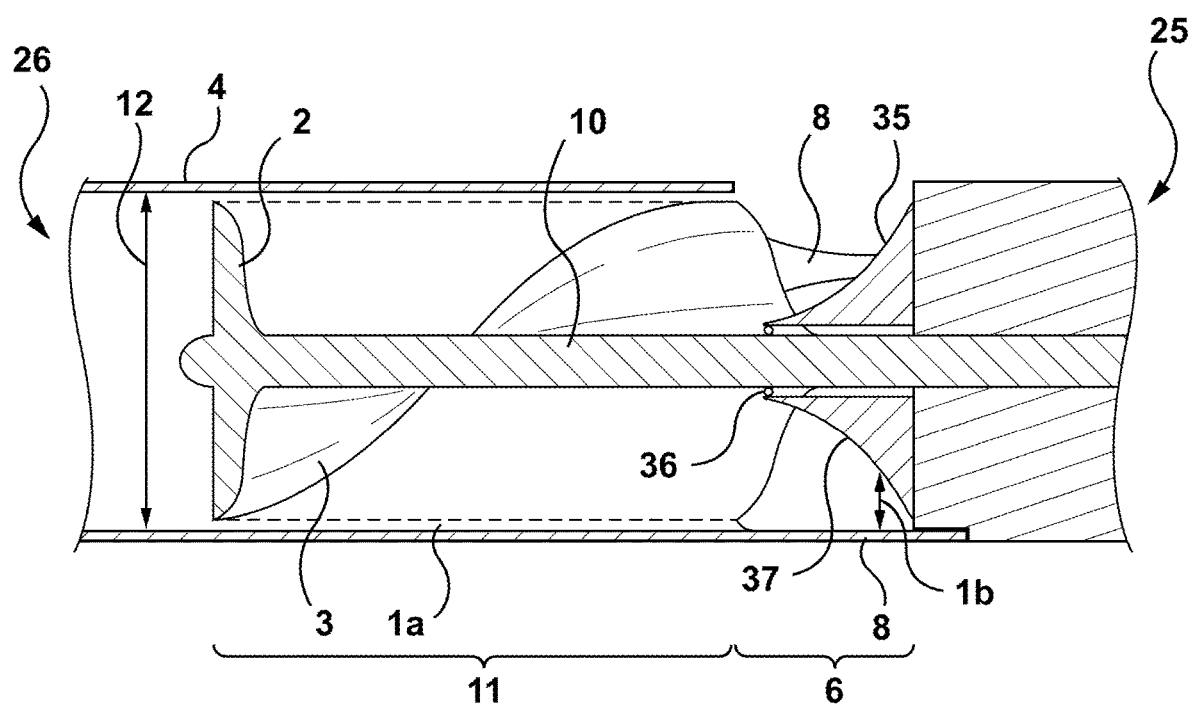
FIG. 9 is a schematic illustration of an MCS device having an impeller with impeller blades in a distal impeller region and a conical form in the outflow region that remains stationary with respect to the motor housing and tubular cannula.

Another embodiment is shown in FIG. 9, a schematic illustration of a portion of an MCS device showing a cutaway view of an impeller 2 having impeller blades 3 in the distal impeller region 11 and no impeller blades in the outflow region 6. Similar to the device shown in FIG. 8, there is a conical form 35 in the outflow region. However, the conical form 35 is not rigidly connected to the impeller shaft 10. Instead, the conical form 35 is stationary with respect to the tubular canula 4 or motor housing, for example the conical form 35 may be rigidly connected to the motor housing or the tubular cannula. The impeller shaft 10 passes through the conical form 35. Optionally, a bearing or seal 36 may be positioned between the impeller shaft 10 and the conical form 35. The conical form may have a concave surface 37 to facilitate directing blood flow out through the windows 7. Optionally, a proximal portion of the conical form 35 may have a convex surface (not shown). The first radial gap 1a between impeller blades 3 and the inner surface of the tubular cannula 4 may be in a range of 0.04 mm to 0.5 mm (e.g., 0.1 mm). In the outflow region a second radial gap between the conical form 35 and inner surface of the struts 8 may be as little as 0, in other words the conical form 35 may connect to the struts 8 at the proximal end and the distance between the conical form 35 and struts 8 may increase moving distally.

Figure 10:
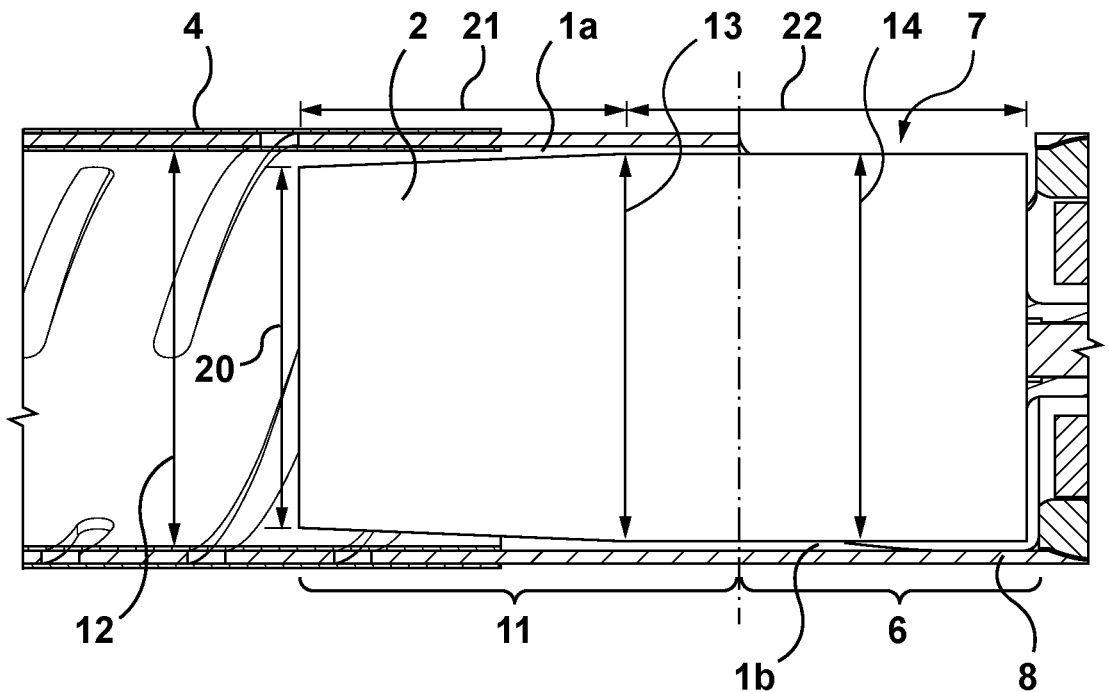
FIG. 10 is a schematic illustration of an MCS device having an impeller having a tapered distal section.

Another embodiment is shown in FIG. 10, a schematic illustration of a cutaway view of a portion of an MCS device showing an impeller region. For simplification, the impeller 2 is shown as an outline of the extent of the impeller's outer diameter. Such outline may refer to a geometric reference volume, which may be cylindrical, that is swept out by the rotating impeller 2. The outline may thus be a maximum diameter of impeller blades 3. The impeller 2 may have two or more of the impeller blades 3, preferably balanced radially. In some embodiments, the impeller 2 may be mounted on a drive shaft 10. As shown in FIG. 10, the impeller 2 is positioned within a tubular cannula 4 having an outflow region 6 and distal impeller region 11, as shown in FIG. 2A. In contrast to other embodiments described herein, the first impeller diameter 13 in at least a portion of the distal region 11 is equal to the second impeller diameter 14 in the outflow region 6. In some embodiments, the distal impeller region 11 may have a distally tapered section 21 that tapers distally to a distal end of the region 11. In other words, the distal impeller region 11 may include a distally tapered section 21 positioned distal to a constant diameter section 22. The constant diameter section 22 can extend proximally from the distally tapered section 21 at least partially within the impeller region 11 and can extend into the outflow region 6.

A first radial gap between the impeller 2 and surrounding tubular structure at a first region may be greater than a second radial gap between the impeller 2 and surrounding tubular structure at a second region, where the second region is located proximal of the first region. A first diameter of the impeller 2 at a first region may be less than a second diameter of the impeller 2 at a second region, where the second region is located proximal of the first region. The distal diameter 20 may be less than the first diameter 13. As used herein, the "diameter," "width," "gap," etc. related to the impeller and a surrounding structure may be measured with respect to the maximum radially outer width of the impeller in that region, which may be an outline of a geometric reference volume swept out by the rotating impeller 2, as described above.

In some embodiments, the diameter of the impeller in the distally tapered section 21 may decrease from a maximum at the first diameter 13 to a relatively smaller distal diameter 20 over the length of the distally tapered section 21. In some embodiments, the tapering of the distally tapered section 21 can prevent contact between the distal aspects of the impeller 2 and the tubular inflow cannula 4. As shown in FIG. 10, in some embodiments, the impeller 2 may be mounted to the drive shaft 10 at its proximal end and not held by a bearing at its distal end. Furthermore, the tubular inflow cannula 4 can be cantilevered from the motor housing. In this configuration there is a possibility of the tubular inflow cannula 4 deflecting slightly, which may be more pronounced in the distal impeller region 11 compared to the outflow region 6. Also, there could be very small imperfections in mounting the impeller 2 with its axis of rotation exactly parallel and aligned with the axis of rotation of the drive shaft 10. These factors may contribute to a risk of contact between the impeller 2 and cannula 4, particularly at the distal end of the impeller 2. The dimensions of the distally tapered section 21 may be chosen to reduce or eliminate the risk of contact while having negligible effects on flow efficiency. These dimensions may depend on the length of the impeller 2 and the inner diameter of the cannula 4.

In one implantation of an MCS device, the impeller 2 has a length between a proximal edge to a distal edge in a range of 7.5 mm to 8.5 mm (e.g., 7.97 mm) and the inlet tube has an inner diameter in a range of 4.39 mm to 4.45 mm (e.g., about 4.42 mm), at least in the region where the impeller 2 is positioned. The difference between the first diameter 13 and the distal diameter 20 may be in a range of 0.040 mm to 0.100 mm (e.g., 0.050 mm to 0.090 mm, 0.060 mm to 0.080 mm, or about 0.070 mm). The first diameter 13 may be about 4.270 mm, the distal diameter 20 may be about 4.200 mm, and the length of the tapered section 21 may be about 3 mm. Thus, the slope of the tapered section 21 may be (0.07 mm/2)/3 mm=0.0117. The resulting radial gap between the impeller 2 and the canula 4 may be constant in the constant diameter section 22, for example in a range of 0.060 to 0.090 mm (e.g., about 0.075 mm), and increase to a gap in a range of 0.095 to 0.125 mm (e.g., about 0.110 mm) at the distal edge of the impeller 2, where the impeller 2 has the distal diameter 20.

Optionally, the distally tapered section 21 may have a taper at a linear slope. Alternatively, the decrease in diameter may be non-linear, for example, a concave, convex or complex curve.

Figure 11:
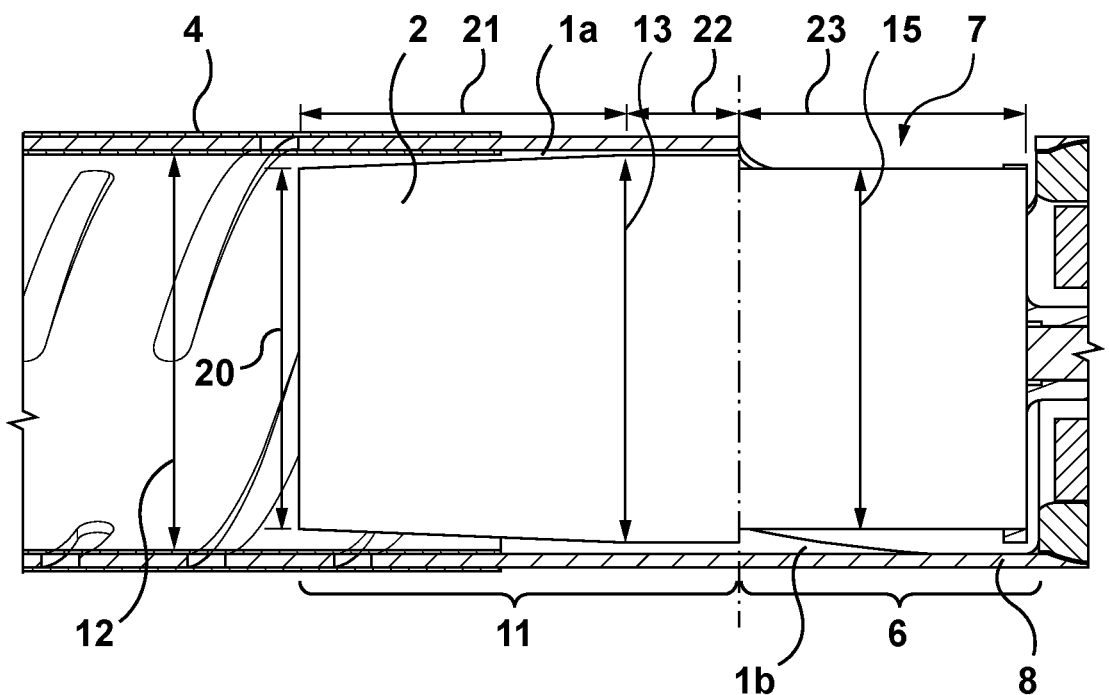
FIG. 11 is a schematic illustration of an MCS device having an impeller having a tapered distal section and a proximally narrowed section.

Optionally, as shown in FIG. 11, the impeller 2 may have the distally tapered section 21, and additionally have a proximal narrowed diameter section 23 aligned at least partially in the outflow region 6. This embodiment may have the benefits of decreased risk of contact between the impeller 2 and the cannula 4. This embodiment also may have improved hemolysis in the outflow region 6. The narrowed diameter 15 of the narrowed diameter section 23 of the impeller 2 may be in a range of 0.15 mm to 0.35 mm (e.g., about 0.25 mm) narrower than the first diameter 13. The radial gap between the impeller 2 and cannula 4, or at least the outflow struts 8 at the narrowed diameter section 23 (for example, at the location of the narrowed diameter 15), may be about 0.20 mm, or about 0.125 mm greater than the minimum radial gap in the distal impeller region 11 (for example, at the location of the maximum diameter 13).

In some embodiments, an MCS device may have an impeller having a different configuration than the one shown in FIG. 2A and have a variable radial gap between the impeller and surrounding cannula or impeller housing. For example, FIG. 12A shows a partial cutaway view of a portion of an MCS device including an impeller 2. A distal end of the impeller 2 may be held in an axial center of a tubular inflow cannula or impeller housing 4 by a bearing 43. The bearing 43 may have spokes that connect it to the cannula or impeller housing 4 maintaining its position with respect to the cannula or impeller housing 4. This may reduce or eliminate the risk of the distal end of the impeller 2 from contacting the cannula or impeller housing 4. In some embodiments, this configuration may benefit from a reduced impeller diameter in the outflow region 6 to reduce hemolysis. Thus, the MCS device may have a first radial gap in the distal impeller region 11 and a second radial gap at least partially in the outflow region 6, wherein the second radial gap is larger than the first radial gap, for example, as described in other embodiments herein. The first radial gap may be about 0.075 mm and the second radial gap may be about 0.200 mm. In some embodiments, the second radial gap may be in a range of two to three times first radial gap.

Figure 12B:
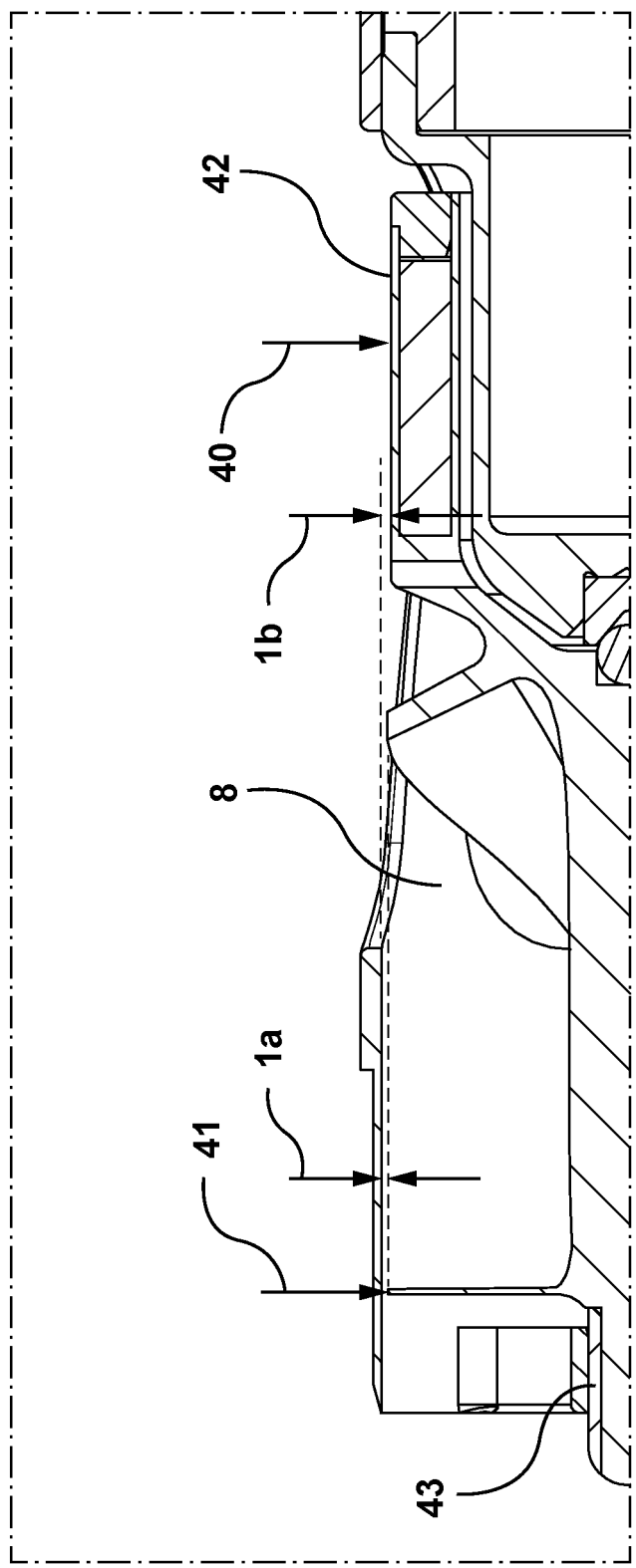
FIG. 12B is a close up view of a portion of FIG. 12A.

The impeller 2 may be configured to be coupled to a motor 9 with a contactless magnetic coupling, as shown in FIG. 12. To achieve a magnetic coupling the impeller 2 may by joined to a driven magnetic rotor 42 that surrounds a second magnetic rotor 44 mounted to a drive shaft of the motor 9. Embodiments of examples of such a configuration are disclosed in International PCT Publication Numbers WO 2019/219874, WO 2019/219883, WO 2020/011795, WO 2020/011797, WO 2020/030700, WO 2020/064911, and pending U.S. Provisional Application No. 63/116,616, which are incorporated by reference herein in their entirety. The driven magnetic rotor 42 may be positioned in the outflow region 6 along with a portion of the impeller blades 3. In some embodiments, the cannula or impeller housing 4 surrounding the impeller 2 may have a constant inner diameter. The impeller 2 may have a first diameter 41, and the driven magnetic rotor 42 may have a second diameter 40 that is smaller than the first diameter 41. This may result in a first radial gap 1a around the impeller 2 (e.g., in a range of 0.065 to 0.150 mm, about 0.070 mm to 0.110 mm, or about 0.075 mm) that is smaller than a second radial gap 1b around the driven magnetic rotor 42, which may be in a range of two to three times the first radial gap, as shown in FIG. 12B, a closeup of a portion of FIG. 12A. As shown in FIG. 12A, the first diameter 41 may be positioned within the distal impeller region (11), and the second diameter 40 may be positioned within the outflow region 6. For example, impeller blades may have a maximum outer diameter that changes from a first diameter 41 in the distal impeller region 11 to a second diameter 40 at least partially in the outflow region 6, and/or the impeller blades may have a maximum outer diameter equal to the first diameter 41 in the distal impeller region 11 and the impeller 2 may include a magnetic coupling 42 that has a maximum outer diameter equal to the second diameter 40 positioned at least partially in the outflow region 6.

While the above description provides examples of one or more processes or apparatuses, it will be appreciated that other processes or apparatuses may be within the scope of the accompanying claims.

Specific embodiments described herein are not intended to limit any claim, and any claim may cover processes or apparatuses that differ from those described below, unless specifically indicated otherwise. The claims are not limited to apparatuses or processes having all of the features of any one apparatus or process described below or to features common to multiple or all of the apparatuses described below, unless specifically indicated otherwise. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Various modifications to the implementations described in this disclosure will be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims can be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A mechanical circulatory support device comprising:
   a tubular cannula comprising an inflow region, an outflow region, and a distal impeller region, and
   an impeller having a proximal end and a distal end, the impeller being positioned within the tubular cannula at least partly in the outflow region and at least partly in the distal impeller region,
   wherein a radial gap between the impeller and an inner surface of the tubular cannula varies in size between the proximal end and the distal end, wherein the size of the radial gap at a particular location between the proximal end and the distal end comprises a radial distance between a maximum impeller width and the inner surface of the tubular cannula at the particular location,
   wherein the impeller comprises a distally tapered section tapering distally from a first diameter to a distal diameter, wherein the distal diameter is less than the first diameter, and
   wherein the impeller comprises a constant diameter section extending proximally from the distally tapered section to the proximal end of the impeller, the constant diameter section having the first diameter.

2. The device of claim 1, wherein the constant diameter section extends at least partially within the distal impeller region and at least partially into the outflow region.

3. The device of claim 1, wherein the radial gap is between 0.095 mm and 0.125 mm at a location of the distal diameter.

4. The device of claim 1, wherein the radial gap is between 0.060 mm and 0.090 mm at the location of the first diameter.

5. The device of claim 1, wherein the distal diameter is between 0.040 mm and 0.100 mm less than the first diameter.

6. The device of claim 5, wherein the tapered section tapers at a linear slope.

7. The device of claim 1, wherein the distal diameter is between 0.06 mm and 0.08 mm less than the first diameter.

8. The device of claim 7, wherein the tapered section tapers at a linear slope.

9. The device of claim 1, wherein a slope of the tapered section is 0.017.

10. A mechanical circulatory support device comprising:
    a tubular cannula comprising an inflow region, an outflow region, and a distal impeller region,
    an impeller having a proximal end and a distal end, the impeller being positioned within the tubular cannula at least partly in the outflow region and at least partly in the distal impeller region, wherein the impeller has a constant diameter within the outflow region; and
    a driven magnetic rotor, wherein the impeller is coupled to the driven magnetic rotor,
    wherein a radial gap between the impeller and an inner surface of the tubular cannula varies in size between the proximal end and the distal end, wherein the size of the radial gap at a particular location between the proximal end and the distal end comprises a radial distance between a maximum impeller width and the inner surface of the tubular cannula at the particular location.

11. The device of claim 10, further comprising a bearing configured to hold the distal end of the impeller in an axial center of the tubular cannula, wherein the bearing comprises a plurality of spokes connecting the bearing to the tubular cannula and configured to maintain the position of the bearing with respect to the tubular cannula.

12. The device of claim 10, wherein the driven magnetic rotor is positioned at least partially in the outflow region.

13. The device of claim 10, wherein the radial gap between the impeller and the inner surface of the tubular cannula is greater in the outflow region than in the distal impeller region.

14. The device of claim 10, wherein the impeller comprises a constant diameter from the proximal end to the distal end.

15. A mechanical circulatory support device comprising:
a tubular cannula comprising an inflow region, an outflow region, and a distal impeller region, and
an impeller positioned in the tubular cannula partly in the outflow region and partly in the distal impeller region,
wherein a first radial gap between the impeller and the distal impeller region is smaller than a second radial gap between the impeller and the outflow region of the tubular cannula, and
wherein the impeller has a constant diameter from a proximal end to a distal end of the impeller.

16. The device of claim 15, wherein the outflow region comprises one or more struts.

17. The device of claim 16, wherein the struts have a thickness that is greater than a thickness of the tubular cannula.

18. The device of claim 15, wherein the first radial gap is in a range of 0.04 mm to 0.5 mm.

19. The device of claim 15, wherein the second radial gap is in a range of 0.04 mm to 3 mm.

* * * * *